(12) United States Patent
Yoshida

(10) Patent No.: US 7,136,085 B2
(45) Date of Patent: Nov. 14, 2006

(54) IMAGE-FORMING APPARATUS AND OPTICAL SCANNER

(75) Inventor: Yoshiki Yoshida, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 335 days.

(21) Appl. No.: 10/882,222

(22) Filed: Jul. 2, 2004

(65) Prior Publication Data

US 2005/0036028 A1 Feb. 17, 2005

(30) Foreign Application Priority Data

| Jul. 7, 2003 | (JP) | ............................. 2003-193239 |
| Sep. 16, 2003 | (JP) | ............................. 2003-323051 |
| Jan. 27, 2004 | (JP) | ............................. 2004-017921 |

(51) Int. Cl.
*B41J 2/47* (2006.01)

(52) U.S. Cl. ........................ 347/235; 347/250; 347/132

(58) Field of Classification Search ................ 347/235, 347/250, 132, 233
See application file for complete search history.

(56) References Cited

U.S. PATENT DOCUMENTS

| 4,933,874 A | 6/1990 | Asada et al. |
| 4,967,284 A | 10/1990 | Yoshida et al. |
| 5,027,117 A | 6/1991 | Yoshida et al. |
| 5,068,676 A | 11/1991 | Yoshida et al. |
| 5,309,182 A | 5/1994 | Mama et al. |
| 5,376,994 A | 12/1994 | Mama et al. |
| 6,788,320 B1 | 9/2004 | Yoshida |
| 6,791,596 B1 * | 9/2004 | Nihei et al. .................. 347/247 |
| 6,906,739 B1 * | 6/2005 | Suzuki et al. ............... 347/233 |
| 7,050,080 B1 * | 5/2006 | Ema et al. .................... 347/235 |
| 2004/0036757 A1 * | 2/2004 | Yoshida ....................... 347/132 |

FOREIGN PATENT DOCUMENTS

| JP | 2000-141754 | 5/2000 |
| JP | 2001-318327 | 11/2001 |

\* cited by examiner

*Primary Examiner*—Huan Tran
(74) *Attorney, Agent, or Firm*—Oblon, Spivak, McClelland, Maier & Neustadt, P.C.

(57) ABSTRACT

An image-forming apparatus is disclosed that includes at least one imaging optical system forming an electrostatic latent image on the scanning surface of a medium moving in a sub scanning direction by scanning the scanning surface in a main scanning direction by periodically deflecting a laser beam with a rotary deflector, a pixel clock generation part generating a pixel clock signal for controlling the emission timing of the laser beam and changing the phase of the pixel clock signal, a region setting part setting the length of each of multiple regions based on image writing magnifications in a line in the main scanning direction, the regions being formed by dividing part of the scanning surface corresponding to the line in the main scanning direction, and a phase control part controlling the changing of the phase of the pixel clock signal region by region based on the image writing magnifications.

15 Claims, 39 Drawing Sheets

MAIN SCANNING DIRECTION

FIG.19

| | |
|---|---|
| AREA 0 : CORRECTION[     ] | : CORRECTION COEFFICIENT[     ] |
| AREA 1 : CORRECTION[     ] | : CORRECTION COEFFICIENT[     ] |
| AREA 2 : CORRECTION[     ] | : CORRECTION COEFFICIENT[     ] |
| AREA 3 : CORRECTION[     ] | : CORRECTION COEFFICIENT[     ] |
| AREA 4 : CORRECTION[     ] | : CORRECTION COEFFICIENT[     ] |
| AREA 5 : CORRECTION[     ] | : CORRECTION COEFFICIENT[     ] |
| AREA 6 : CORRECTION[     ] | : CORRECTION COEFFICIENT[     ] |
| AREA 7 : CORRECTION[     ] | : CORRECTION COEFFICIENT[     ] |
| AREA 8 : CORRECTION[     ] | : CORRECTION COEFFICIENT[     ] |
| AREA 9 : CORRECTION[     ] | : CORRECTION COEFFICIENT[     ] |
| AREA10 : CORRECTION[     ] | : CORRECTION COEFFICIENT[     ] |

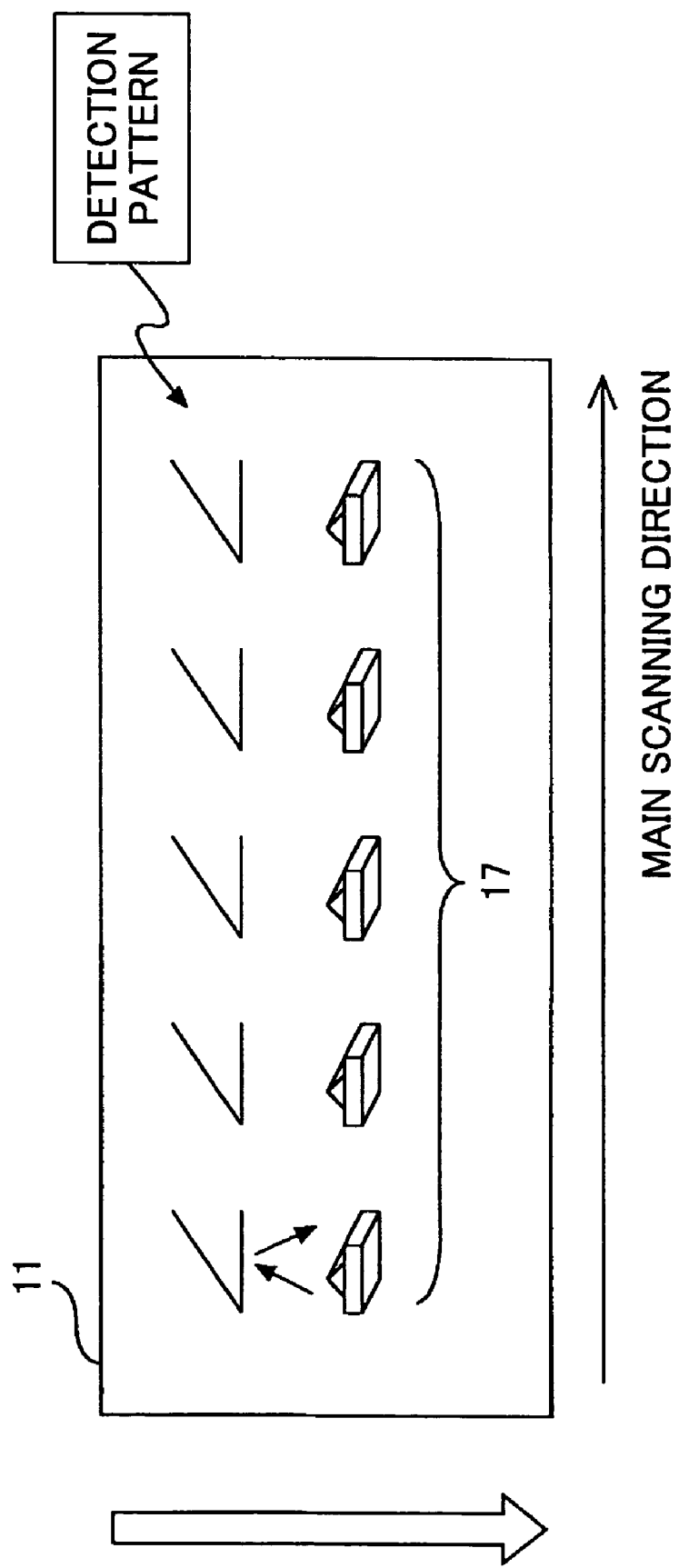

IMAGE-FORMING APPARATUS AND OPTICAL SCANNER

BACKGROUND OF THE INVENTION

1. Field of the Invention

The present invention relates generally to image-forming apparatuses and optical scanners, and more particularly to an image-forming apparatus and an optical scanner that employ an LD (laser diode) optical system.

2. Description of the Related Art

Some conventional image-forming apparatuses employ a laser beam to form an image. According to this laser-beam method, the image-forming apparatuses form an image by an optical scanner emitting a laser beam on the scanning surface (or the surface to be scanned) of a photosensitive body (a medium to be scanned).

A description is given below, with reference to FIG. 1, of the operation of forming an image on a photosensitive body by an optical scanner according to the conventional laser-beam method. FIG. 1 is a diagram showing an image-forming operation by a conventional image-forming apparatus employing the laser-beam method.

First, a charging unit (not graphically represented) such as a roller-type contact charger evenly charges a photosensitive body. A laser light source 1101 emits a laser beam to a rotary polygon mirror 1103. The polygon mirror 1103 periodically deflects the laser beam emitted from the laser light source 1101 so that the laser beam is transmitted through an fθ lens 1105 to scan the scanning surface of the photosensitive body repeatedly along a main scanning direction, the photosensitive body moving (rotating) in a sub scanning direction. On the photosensitive body, static electricity is removed from a beam spot or a part onto which the laser beam is emitted, so that an electrostatic pattern (an electrostatic latent image) is formed on the photosensitive body.

A controller (not graphically represented) causes image data in units of pages to be fed line by line (scan by scan) as an image signal (a video signal) to a laser driving circuit. The laser driving circuit outputs the image signal to the laser light source 1101 in synchronization with a pixel clock signal (a writing clock signal) to perform modulation. The pixel clock signal is input via a phase synchronization circuit from a pixel clock generator circuit (not graphically represented) forming a pixel clock generation part and a phase setting part.

Next, a description is given, with reference to FIG. 2, of the relationship between the pixel clock signal and its phase change (phase setting). FIG. 2 is a timing chart showing an example of the relationship between the pixel clock signal and its phase change. Referring to FIG. 2, the pixel clock generator circuit establishes synchronization with a synchronization detection signal input from a synchronization detection sensor, and generates and outputs a pixel clock signal clkw of (b), using a reference clock signal (an original clock signal) clko of (a) n times (four times in FIG. 2) the frequency of the pixel clock signal clkw and toggling the signal level between HIGH (H) and LOW (L) every four clock pulses of clko by count control. The reference clock signal clko is generated from an oscillator not graphically represented.

When the above-described optical scanner writes the electrostatic latent image by forming laser beam spots on the scanning surface, the optical scanner performs control so that the laser beam spots are written or formed at a uniform density.

However, once an environmental variation such as a change in temperature occurs around the fθ lens 1105, the fθ lens 1105 undergoes distortion so that its refractive index is changed. Further, when an environmental variation such as a change in temperature occurs around the laser light source 1101, the wavelength of the laser beam emitted from the laser light source is changed. The fθ lens 1105 refracts the entering laser beam at a predetermined angle in accordance with the wavelength of the entering laser beam. As a result, as shown in FIG. 1, an error may be caused in the angle of refraction of the laser beam entering the fθ lens 1105 so as to cause an error in the writing magnification (optical scanning length) per main scanning period (hereinafter, scanning period) of the laser beam deflected by the polygon mirror 1103, thus affecting an output image. In this case, the phase of the pixel clock signal clkw is shifted by phase changing to correct the writing magnification of the laser beam.

In the above-described optical scanner, the pixel clock generator circuit performs phase control using external pulse trains xpls in order to perform phase changing to shift the phase of the pixel clock signal clkw.

There are two types of external pulse trains xpls employed: an external pulse train xplsp for delaying the phase of the pixel clock signal clkw (indicated by (c) in FIG. 2) and an external pulse train xplsm for advancing the phase of the pixel clock signal clkw (indicated by (d) in FIG. 2).

For instance, in the case of generating the pixel clock signal clkw from the reference clock signal clko, the external pulse train xplsp or xplsm is input to increase or decrease the number of pulses to be counted of the reference clock signal clko so that a pulse of the pixel clock signal clkw, which is normally generated at an interval of eight pulses of the reference clock signal clko, is generated at an interval of nine or seven pulses of the reference clock signal clko. By changing (decreasing or increasing) the number of pulses to be counted of the reference clock signal clko, the frequency of the pixel clock signal clkw is multiplied by 8/7 (advancing control) or 8/9 (delaying control). As a result, it is possible to shift the pixel clock signal clkw after the phase changing. Letting the time of one main scanning line be Tm, this results in Tm−7/8 (advancing control) (indicated by (f) in FIG. 2) or Tm+9/8 (delaying control) (indicated by (e) in FIG. 2). As a result, the effect that the magnification of the line is enlarged or reduced can be produced. Thus, the optical scanner can form an image at a desired position on the photosensitive body irrespective of an environmental variation.

The pixel clock generator circuit includes a pulse generator circuit generating the external pulse trains xplsp and xplsm. The pulse generator circuit generates the external pulse train (hereinafter also referred to simply as pulses) xplsp or xplsm in accordance with a portion of the pixel clock pulse (train) clkw on which portion it is desired to perform phase changing.

Next, a description is given, with reference to FIG. 3, of the generation of the external pulse train xpls (xplsp or xplsm) by the pulse generator circuit. FIG. 3 is a diagram showing a conventional pulse generator circuit.

Referring to FIG. 3, the pulse generator circuit includes comparators 1001 and 1002 and counters 1003 and 1004.

In the pulse generator circuit, an engine CPU (not graphically represented) sets a pulse generation interval (period) prd in the comparator 1001, and sets the number of pulses num in the comparator 1002. The pulse generator circuit operates as follows when the laser beam is deflected by the polygon mirror 1103 to perform a scan in the main scanning direction.

When a clear signal xlclr generated from the synchronization detection signal by a circuit (not graphically represented) is input to the counter 1003, the counter 1003, using the inputting as a reference point, starts a counting operation to count the number of pulses of the pixel clock signal clkw (a count value i), and stops the counting operation when a stop signal is input to the counter 1003 from the comparator 1002.

The comparator 1001 compares the count value i of the counter 1003 and the preset pulse generation interval (hereinafter also referred to as a set value) prd, and generates a pulse (xpls) every time the count value i reaches the set value prd.

The counter 1004 counts the number of pulses xpls generated from the comparator 1001 (a count value j).

The comparator 1002 compares the count value j of the counter 1004 and the preset number of pulses (hereinafter also referred to as a set value) num, and generates the stop signal when the count value j reaches the set value num.

A description is given below, with reference to FIG. 4, of the generation of the external pulse train xpls in the conventional pulse generator circuit. FIG. 4 is a flowchart of the operation of the pulse generator circuit of FIG. 3.

First, in step S1001, when the pulse generator circuit is turned on, the counters 1003 and 1004 reset their respective count values i and j each to "1."

Thereafter, in step S1002, it is determined whether the clear signal xlclr has been input to the counter 1003. When "NO" in step S1002, the counter 1003 waits until the clear signal xlclr is input thereto. When "YES" in step S1002, after the inputting of the clear signal xlclr, in step S1003, the counter 1003 increments the count value i by one every time a pulse of the pixel clock signal clkw is input thereto.

Then, in step S1004, the comparator 1001 compares the count value i and the set value prd, and determines whether the count value i has reached the set value prd. If the count value i has not reached the set value prd (that is, "NO" in step S1004), the counter 1003 increments the count value i by one. The counter 1003 repeats the operation of step S1003 until the count value i reaches the set value prd.

When the count value i has reached the set value prd (that is, "YES" in step S1004), in step S1005, the comparator 1001 outputs a pulse (xpls). The generated pulse xpls is input to the counter 1003 so that the count value i of the counter 1003 is reset to "1."

In step S1006, the comparator 1002 compares the count value j of the counter 1004 and the set value num, and determines whether the count value j of the counter 1004 has reached the set value num. If the count value j has not reached the set value num (that is, "NO" in step S1006), in step S1007, the counter 1004 increments the count value j by one when the pulse xpls is input thereto.

Thereafter, the counters 1003 and 1004 and the comparator 1001 repeat the above-described operations. When the count value j reaches the set value num (that is, "YES" in step S1006), the comparator 1002 generates the stop signal. As a result, the pulse generator circuit ends the above-described series of operations, which are hereinafter referred to as a pulse generation operation.

FIG. 5 is a timing chart showing the conventional relationship between the clear signal xlclr and the external pulse train xpls.

Referring to FIG. 5, a pulse train generation part starts to output the external pulse train xpls indicated by (b) after the set value prd passes since the inputting of the clear signal xlclr indicated by (a). At this point, the pulse train generation part outputs as many pulses of a pulse width of one clock pulse clkw of the external pulse train xpls as the number of pulses num at the periods (intervals) prd before the inputting of the next clear signal xlclr.

Alternatively, using a RAM table, a fixed pulse train may be generated from output data obtained by counting up addresses based on a pixel clock signal.

FIG. 6 is a diagram showing the conventional image-forming apparatus with no fθ lens. As shown in FIG. 6, when the image-forming apparatus has no fθ lens, the optical system performs scanning with the laser beam being deflected by the polygon mirror 1103 at equal angles, that is, in a way to draw an arc. Accordingly, when scanning is performed linearly for a line on the photosensitive body surface, the light beam forms beam spots (images) on the photosensitive body surface at varying intervals even if the same interval is assumed for the center and the ends of the line. Further, the distance of beam emission to the photosensitive body surface varies between the center and the ends of the line. As a result, the beam diameter also varies between the center and the ends of the line during the single scan on the photosensitive body surface.

In contrast, the image-forming apparatus of FIG. 1 includes the fθ lens 1105 (and another lens group) in order to control the variations in beam spot interval and beam diameter caused in the image-forming apparatus of FIG. 6.

According to the image-forming apparatus of FIG. 1, the refractive index is controlled so as to absorb the difference in magnification between the center and each end of a single scanning line on the photosensitive body.

Such prior art technologies for controlling the magnification of an image in the main scanning direction as described above are disclosed in, for instance, Japanese Laid-Open Patent Applications No. 2000-141754 (JP 2000-141754) and No. 2001-318327 (JP 2001-318327). According to JP 2000-141754, in an image-forming apparatus where a light source is driven according to an image signal based on a writing clock signal, a scanning part causes a light beam emitted from the light source to perform scanning in the main scanning direction on a photosensitive body moving in the sub scanning direction so that an image is written on the photosensitive body, and the image on the photosensitive body is transferred onto transfer paper, the magnification of the image in the main scanning direction is corrected based on the size of the transfer paper in the main scanning direction.

According to JP 2001-318327, an optical beam scanner divides a scanning region on a scanning surface in two in the main scanning direction, and performs scanning with two imaging optical systems.

FIG. 7 is a graph showing beam emission positions on a photosensitive body surface and magnification deviations according to a conventional image-forming apparatus using an fθ lens as shown in FIG. 1.

In the conventional image-forming apparatus, the characteristic of the fθ lens is corrected on average. As a result, there is a tendency for magnification to become positive (+) within a predetermined distance from each end toward a center and negative (−) in the vicinity of the center and each end on a single scanning line.

In the case of forming an image by superposing several colors and in an optical system with emphasis on accuracy, such error components cause misregistration between color images, thus degrading image quality.

Even in the case of dividing an image region equally into multiple areas on a single scanning line so that magnification is corrected area by area, corrections are concentrated in particular areas. As a result, an increased number of pulses cannot be accommodated in such areas, thus preventing accurate correction from being performed.

SUMMARY OF THE INVENTION

Accordingly, it is a general object of the present invention to provide an image-forming apparatus and an optical scanner in which the above-described disadvantages are eliminated.

A more specific object of the present invention is to provide an image-forming apparatus that can eliminate the color misregistration and magnification deviations of an image in the main scanning direction by measuring partial magnifications and performing magnification correction in each region on a single scanning line with respect to each optical system provided in the image-forming apparatus.

Another more specific object of the present invention is to provide an optical scanner suitable for such image forming.

One or more of the above objects of the present invention are achieved by an image-forming apparatus including: at least one imaging optical system configured to form an electrostatic latent image on an evenly charged scanning surface of a medium to be scanned moving in a sub scanning direction by scanning the scanning surface in a main scanning direction perpendicular to the sub scanning direction by periodically deflecting a laser beam emitted from a laser light source with a rotary deflector; a pixel clock generation part configured to generate a pixel clock signal for controlling timing of emission of the laser beam by the laser light source and change a phase of the pixel clock signal; a region setting part configured to set length of each of a plurality of regions in the main scanning direction based on image writing magnifications in a line in the main scanning direction, the regions being formed by dividing part of the scanning surface corresponding to the line in the main scanning direction; and a phase control part configured to control the changing of the phase of the pixel clock signal region by region based on the image writing magnifications, wherein the formed image is transferred to a transfer medium and output.

One or more of the above objects of the present invention are achieved by an image-forming apparatus including: at least one imaging optical system configured to form an electrostatic latent image on an evenly charged scanning surface of a medium to be scanned moving in a sub scanning direction by scanning the scanning surface in a main scanning direction perpendicular to the sub scanning direction by periodically deflecting a laser beam emitted from a laser light source with a rotary deflector; a print-out part configured to transfer the formed image to a transfer medium and print out the image; a pixel clock generation part configured to generate a pixel clock signal for controlling timing of emission of the laser beam by the laser light source and change a phase of the pixel clock signal; a region setting part configured to set length of each of a plurality of regions in the main scanning direction based on image writing magnifications in a line in the main scanning direction, the regions being formed by dividing part of the scanning surface corresponding to the line in the main scanning direction; and a phase control part configured to control the changing of the phase of the pixel clock signal region by region based on the printed-out image, the printed-out image being read and input by an image reader connected to the image-forming apparatus.

One or more of the above objects of the present invention are also achieved by an image-forming apparatus including: at least one imaging optical system configured to form an electrostatic latent image on an evenly charged scanning surface of a medium to be scanned moving in a sub scanning direction by scanning the scanning surface in a main scanning direction perpendicular to the sub scanning direction by periodically deflecting a laser beam emitted from a laser light source with a rotary deflector; a print-out part configured to transfer the formed image to a transfer medium and print out the image; a pixel clock generation part configured to generate a pixel clock signal for controlling timing of emission of the laser beam by the laser light source and change a phase of the pixel clock signal; a region setting part configured to set length of each of a plurality of regions in the main scanning direction based on image writing magnifications in a line in the main scanning direction, the regions being formed by dividing part of the scanning surface corresponding to the line in the main scanning direction; a reading part configured to read the printed-out image; and a phase control part configured to control the changing of the phase of the pixel clock signal region by region based on the printed-out image.

One or more of the above objects of the present invention are also achieved by an optical scanner for forming an electrostatic latent image on an evenly charged scanning surface of a medium to be scanned moving in a sub scanning direction by scanning the scanning surface in a main scanning direction perpendicular to the sub scanning direction by periodically deflecting a laser beam emitted from a laser light source with a rotary deflector, the optical scanner including: a pixel clock generation part configured to generate a pixel clock signal for controlling timing of emission of the laser beam by the laser light source and change a phase of the pixel clock signal with respect to each of a plurality of regions on the scanning surface, the regions each having length thereof in the main scanning direction set based on image writing magnifications in a line in the main scanning direction.

According to the present invention, in each imaging optical system mounted in an image-forming apparatus, image writing magnification may be measured for each of divided regions in the main scanning direction and the image writing magnification may be corrected region by region. Accordingly, it is possible to eliminate the color misregistration and magnification deviations of an image in the main scanning direction. Further, according to the present invention, it is possible to realize an optical system in which distortion in the main scanning direction after fθ correction is controlled and that has an optimum characteristic adapted to each optical unit.

BRIEF DESCRIPTION OF THE DRAWINGS

Other objects, features and advantages of the present invention will become more apparent from the following detailed description when read in conjunction with the accompanying drawings, in which:

FIG. 19 is a table of corrections of image writing magnification in a main scanning direction and correction coefficients according to the first embodiment of the present invention;

FIG. 20 is a diagram showing a photosensitive body and position detection sensors according to the first embodiment of the present invention;

DETAILED DESCRIPTION OF THE PREFERRED EMBODIMENTS

A description is given below, with reference to the accompanying drawings, of embodiments of the present invention.

[First Embodiment]

Figure 1:
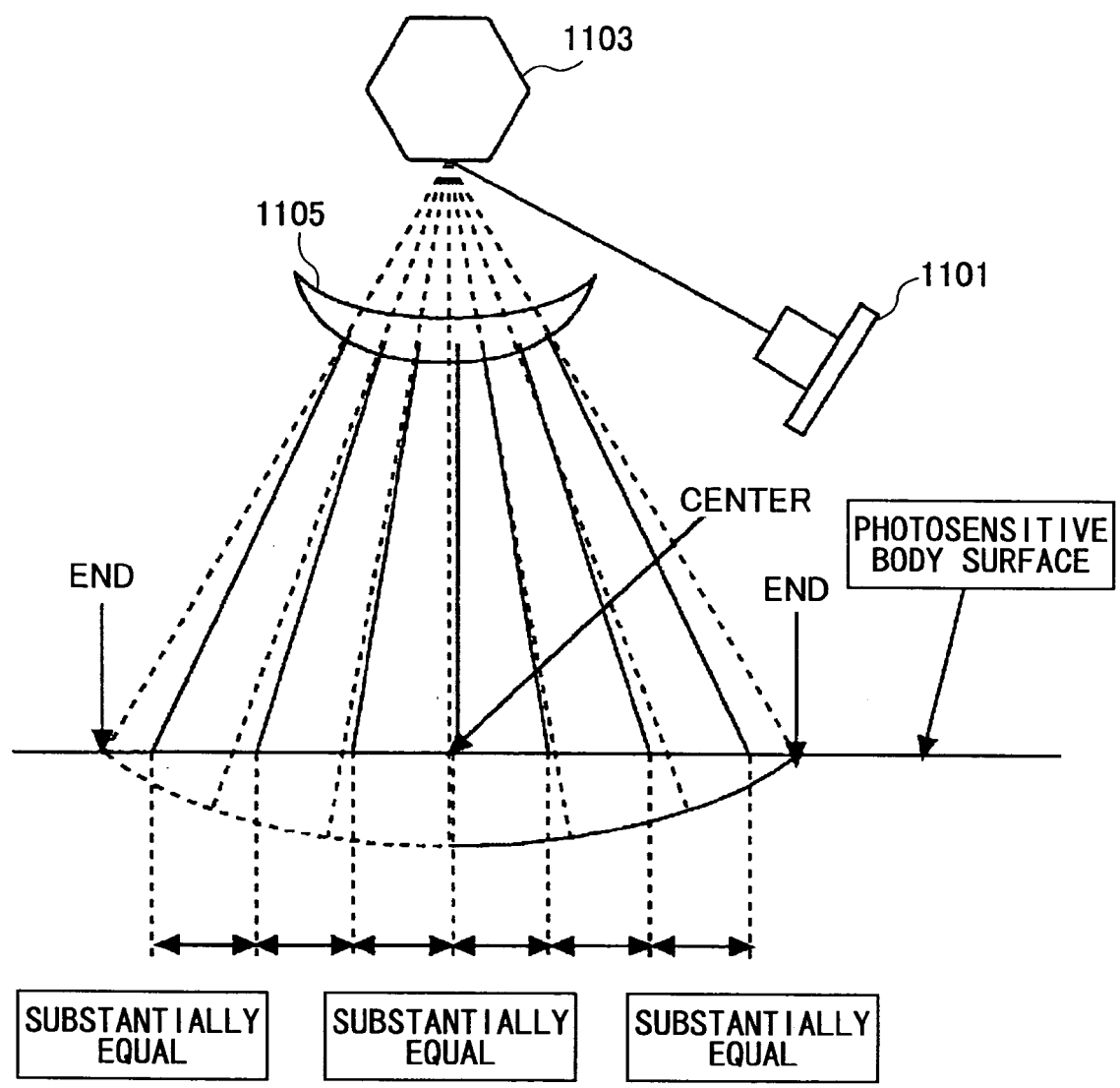
FIG. 1 is a diagram showing an image-forming operation by a conventional image-forming apparatus employing a laser-beam method.
Figure 2:
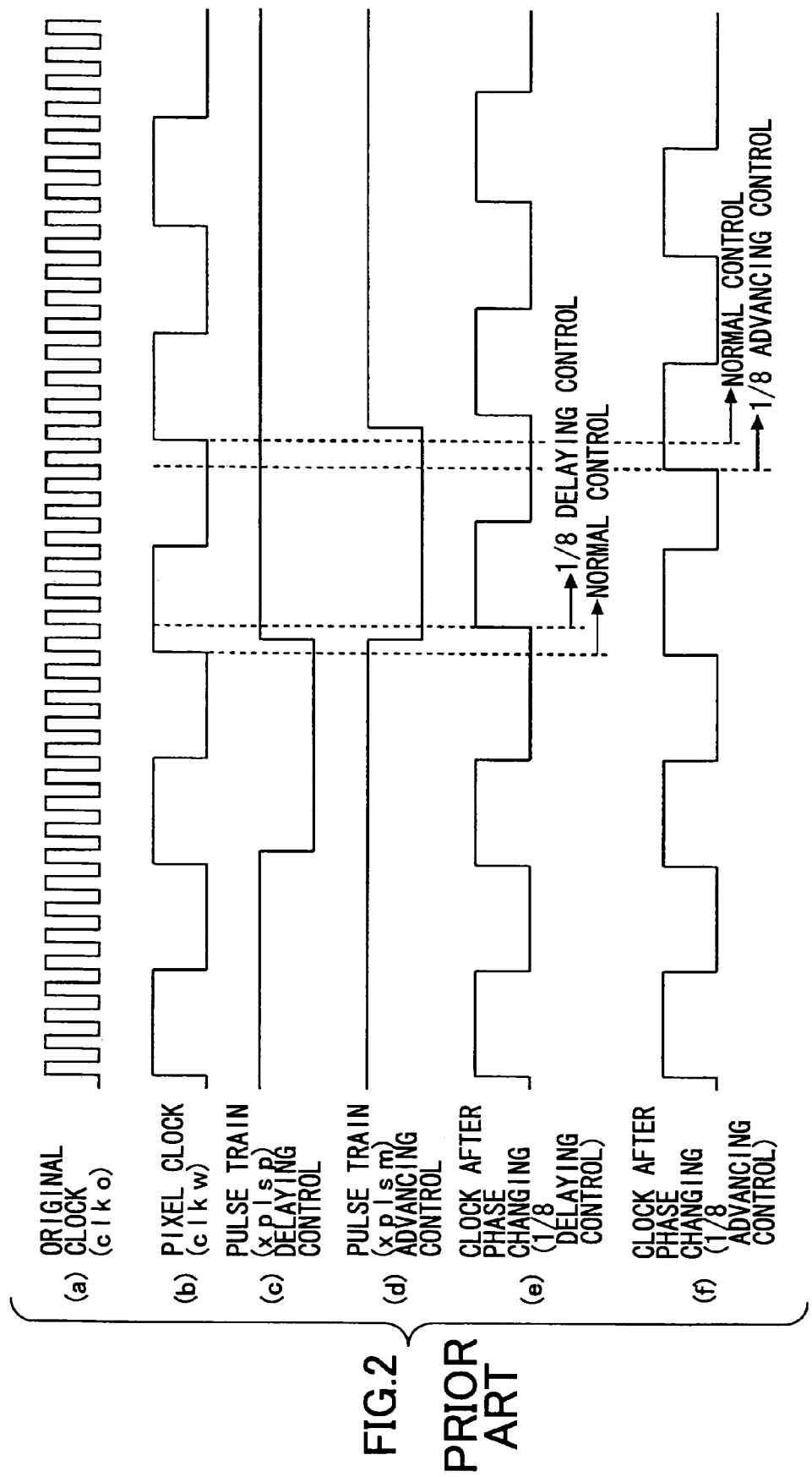
FIG. 2 is a timing chart showing an example of the conventional relationship between a pixel clock signal and its phase change.
Figure 3:
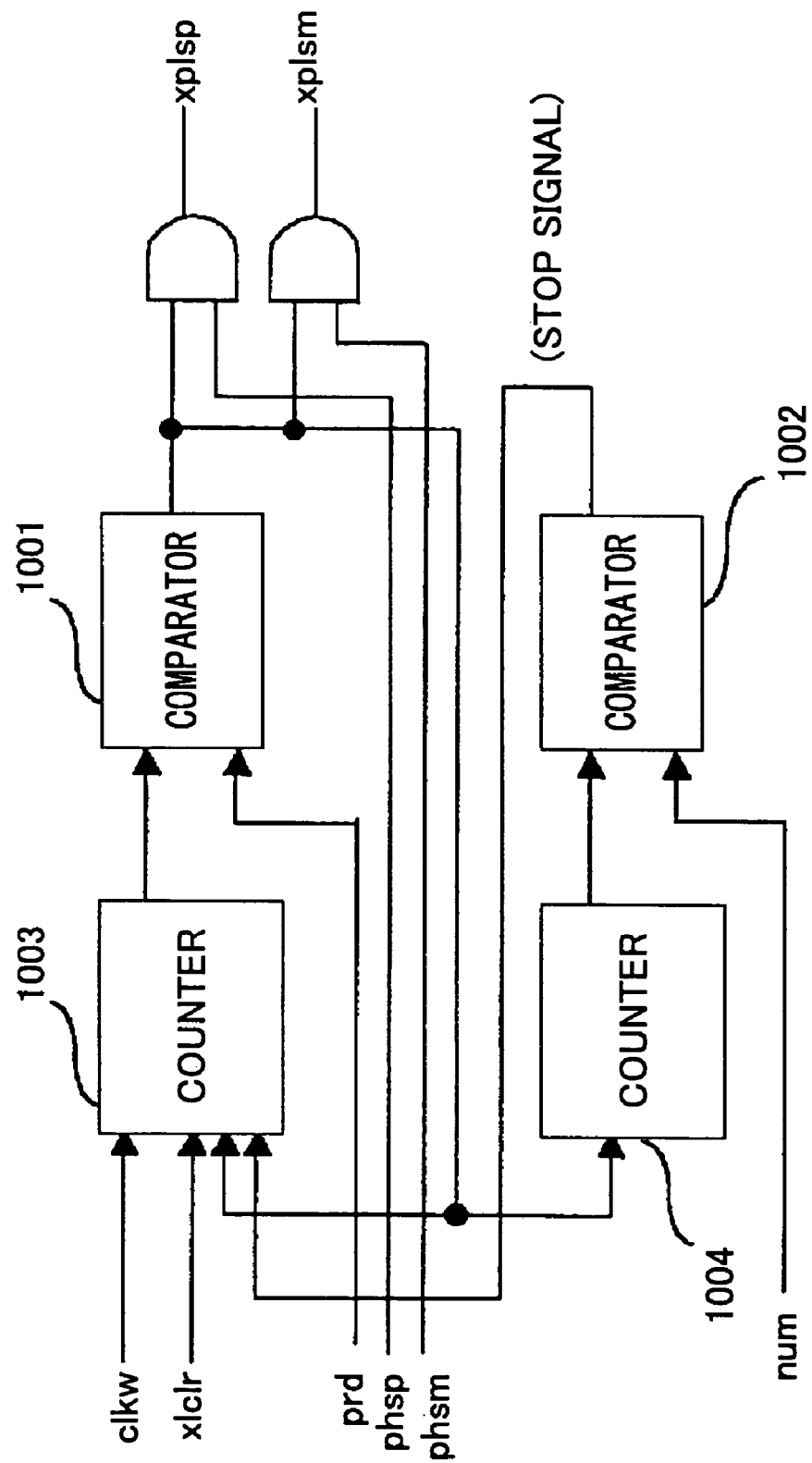
FIG. 3 is a diagram showing a conventional pulse generator circuit.
Figure 4:
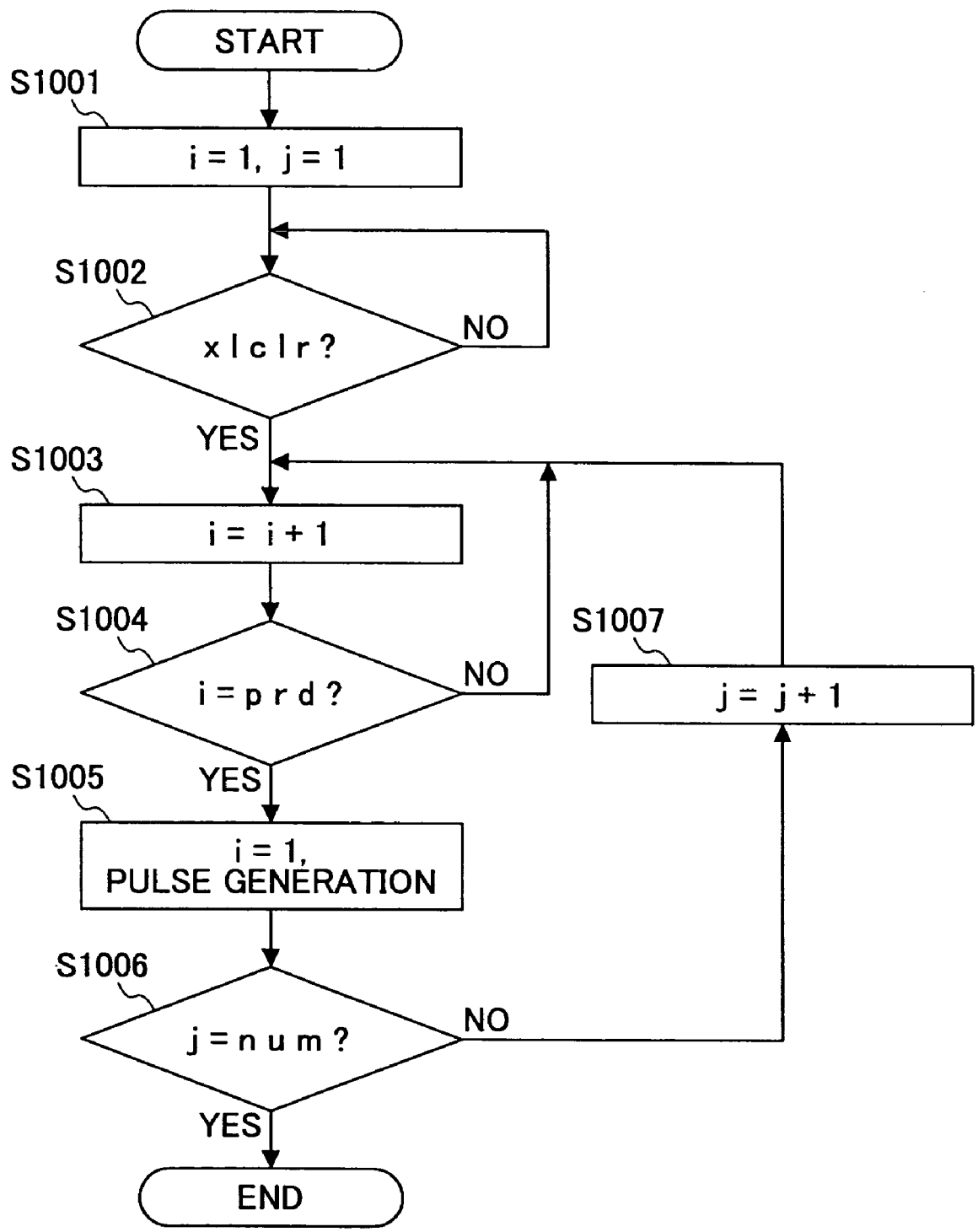
FIG. 4 is a flowchart of the operation of the conventional pulse generator circuit.
Figure 5:
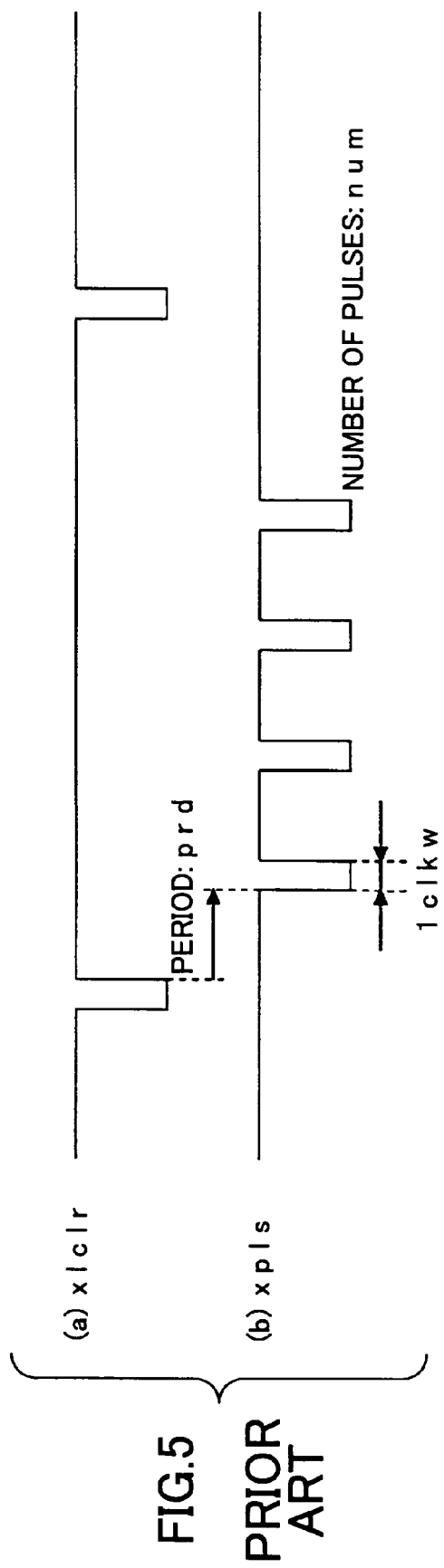
FIG. 5 is a timing chart showing the conventional relationship between a clear signal and an external pulse train.
Figure 6:
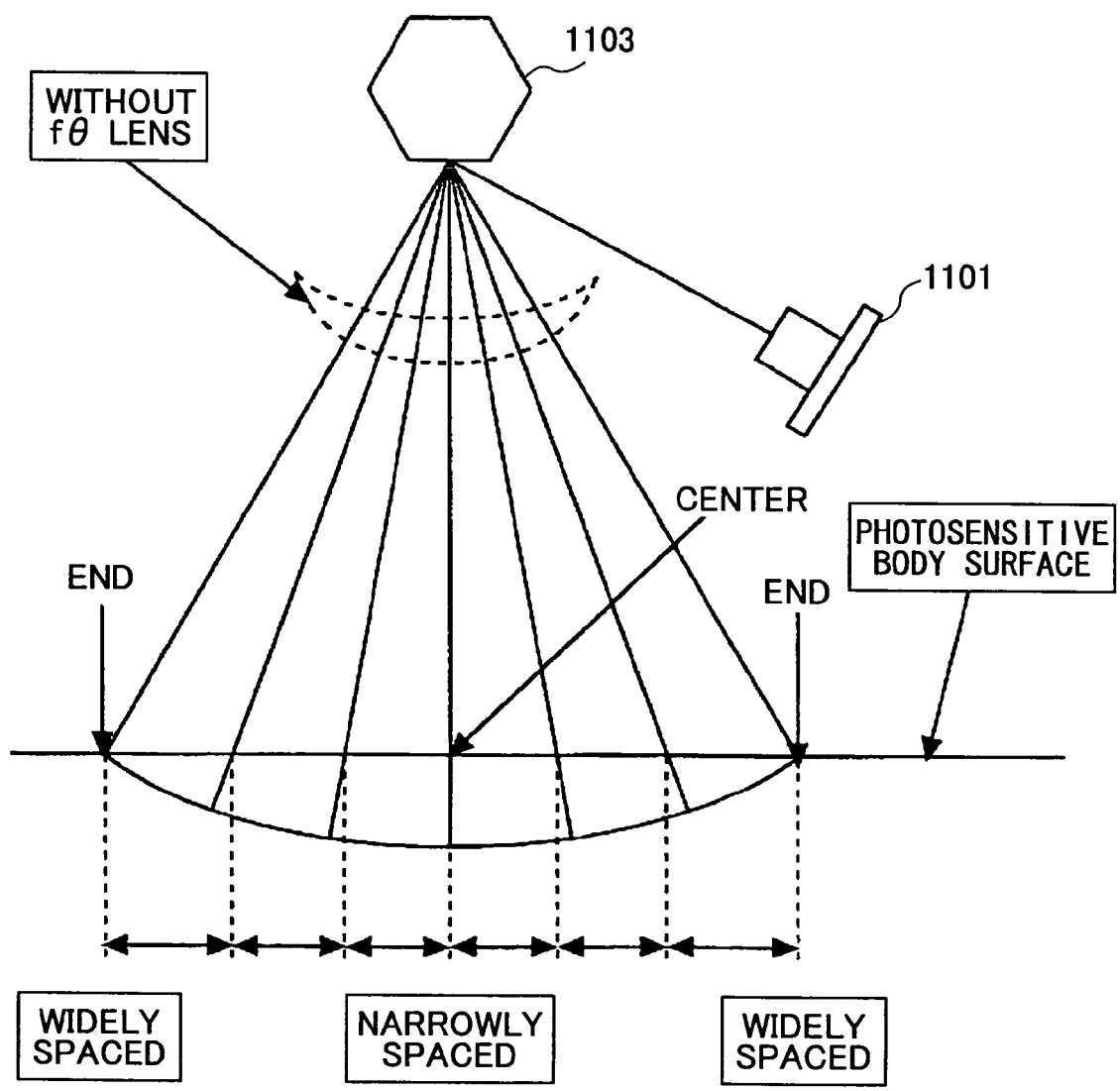
FIG. 6 is a diagram showing the conventional image-forming apparatus with no fθ lens.
Figure 7:
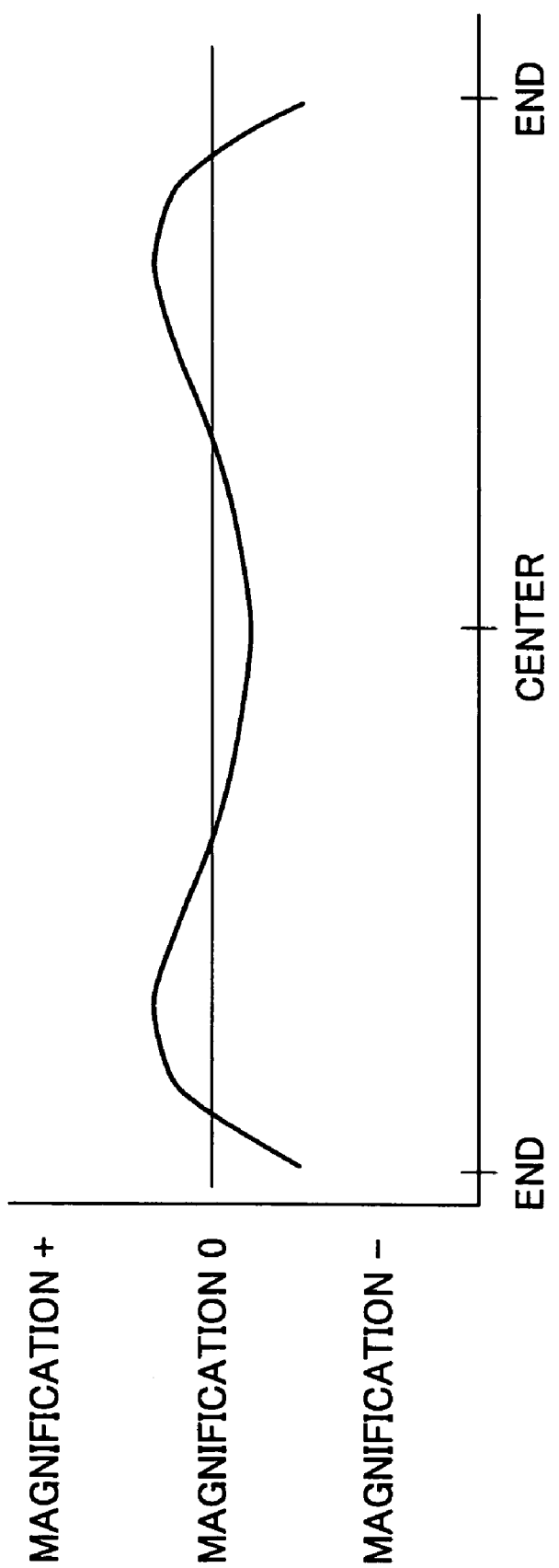
FIG. 7 is a graph showing beam emission positions on a photosensitive body surface and magnification deviations according to a conventional image-forming apparatus.
Figure 8:
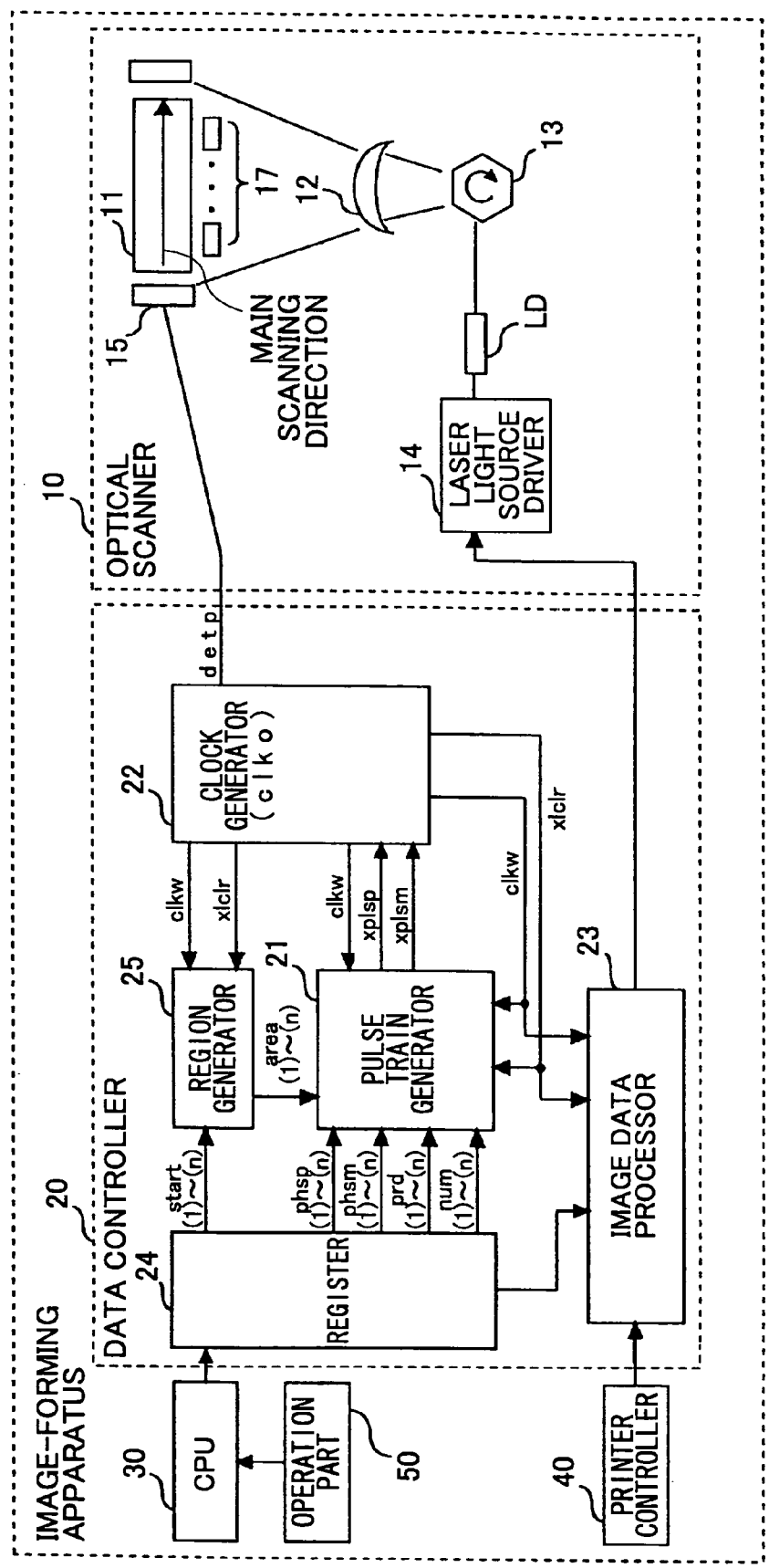
FIG. 8 is a block diagram showing an image-forming apparatus according to a first embodiment of the present invention.

FIG. 8 is a block diagram showing an image-forming apparatus according to a first embodiment of the present invention. The image-forming apparatus may be, for instance, a printer, a copier, or a facsimile machine.

Referring to FIG. 8, the image-forming apparatus includes an optical scanner 10, a data controller 20, a central processing unit (CPU) 30, a printer controller 40, and an operation part 50 as an input part. The actual configuration of the image-forming apparatus is shown simplified in FIG. 8. The image-forming apparatus may have components other than those shown in FIG. 8.

The optical scanner 10, which forms an image using a laser beam, includes a photosensitive body 11 as a medium to be scanned, an fθ lens 12, a polygon mirror 13 as a rotary deflector, a laser light source driver 14, a synchronization detection part 15 as a synchronization detector, multiple position detection sensors 17, and a laser light source LD.

The laser light source LD is a device that emits a laser beam. The laser light source LD may be, for instance, a light-emitting semiconductor device such as a laser diode.

The photosensitive body 11 has its scanning surface (surface to be scanned) formed of a material whose electric characteristics change by exposure to light (a layer of an optical semiconductor). The photosensitive body 11 may be, for instance, a photosensitive body drum rotating in the sub scanning direction.

The fθ lens 12 causes a laser beam deflected by the polygon mirror 13 to form an image on the scanning surface of the photosensitive body 11. The fθ lens 12 deflects a laser beam of a particular wavelength at a predetermined angle of refraction.

The polygon mirror 13, which has a polygonal prism shape, is rotated at uniform velocity by a motor (not graphically represented). With its rotation, the polygon mirror 13 successively changes the angle of reflection of the laser beam emitted from the laser light source LD to be incident on the polygon mirror 13 so that the laser beam performs scanning on the scanning surface of the photosensitive body 11 in the main scanning direction.

The laser light source driver 14, which drives the laser light source LD, operates according to an image signal provided from the data controller 20. More specifically, after a predetermined period of time passes since the synchronization detection part 15 detects a laser beam and inputs a synchronization detection signal detp to the data controller 20, the laser light source driver 14 starts to control modulation (switching on and off) of the laser light source LD according to the image signal provided from the data controller 20, and causes the laser light source LD to emit a laser beam correspondingly. As a result, even if there is a division angle error between the reflecting surfaces of the polygon mirror 13, writing start positions can be aligned at the same position in the main scanning direction on the scanning surface, and writing end positions can be aligned at the same position in the main scanning direction on the scanning surface.

The synchronization detection part 15 is provided outside the image region of the scanning surface of the photosensitive body 11 on a laser beam passage path in the main scanning direction. For instance, the synchronization detection part 15 may be provided immediately before or after a scanning start position. The synchronization detection part 15 detects a laser beam transmitted through the fθ lens 12. When the synchronization detection part 15 detects the laser beam, the synchronization detection part 15 generates the synchronization detection signal detp (for aligning writing start positions at the same position in the main scanning direction) defining a writing start position in the main scanning direction at which the laser beam starts writing. Then, the synchronization detection part 15 outputs the generated synchronization detection signal detp to the data controller 20.

The position detection sensors 17 are disposed opposite the scanning surface of the photosensitive body 11, being equally spaced parallel to the main scanning direction. Each position detection sensors 17 reads the position of an image pattern for detection formed on the photosensitive body 11.

The data controller 20 outputs an image signal for controlling the laser light source driver 14 so as to control a laser beam writing operation by the optical scanner 10. The data controller 20 includes a pulse train generator part 21 as a phase control part, a clock generator part 22 as a pixel clock generation part, an image data processor part 23, a register 24, and a region generator part 25.

The clock generator part 22 establishes synchronization with the synchronization detection signal detp input from the synchronization detection part 15, and generates a pixel clock signal clkw, using a reference clock signal (an original clock signal) clko m times the frequency of the pixel clock signal clkw and toggling the signal level between HIGH (H) and LOW (L) every m clock pulses of clko by count control. The reference clock signal clko is generated from an oscillator (not graphically represented) provided in the clock generator part 22. The clock generator part 22 outputs the generated pixel clock signal clkw to the region generator part 25 and the image data processor part 23. As a result, the scanning start positions of main scanning lines on the photosensitive body 11 can be aligned.

When the clock generator part 22 detects the inputting of the synchronization detection signal detp from the synchronization detection part 15, the clock generator part 22 outputs a clear signal xlclr to the region generator part 25.

When the number of clock pulses of the input pixel clock signal clkw reaches predetermined values after the clear signal xlclr is input from the clock generator part 22, the region generator part 25 outputs area signals area(1), area(2), . . . , area(n−1), and area(n) to the pulse train generator part 21.

When each of the area signals area(1) through area(n) is input to the pulse train generator part 21 from the region generator part 25, the pulse train generator part 21 generates an external pulse train (hereinafter also referred to simply as pulses) xplsp (for phase delaying control) or xplsm (for phase advancing control) that is a control signal for performing phase changing with desired timing on the pixel clock signal clkw generated by the clock generator part 22. Then, the pulse train generator part 21 outputs the generated external pulse train xplsp or xplsm to the clock generator part 22.

The image data processor part 23 performs image processing on image data input from the printer controller 40 using a variety of information items used for image forming input from the register 24, such as information on dot processing and information specifying an image area based on printing paper size.

The image data processor part 23 also outputs an image signal input from the printer controller 40 to the laser light source driver 14 in synchronization with the pixel clock signal clkw.

The operation part 50 as an input part, through which information is input, may be, for instance, a touch panel or a group of key switches such as a keyboard. Set values prd(1) through prd(n) and num(1) through num(n) are input from the operation part 50.

The CPU 30, which is a microcomputer including a central processing unit and a program ROM (read-only memory), controls the engine unit (main body) of the image-forming apparatus including the optical scanner 10 and the data controller 20.

The CPU 30 functions as a scanning time comparison part and a set value calculation part.

The CPU 30 outputs the information input from the operation part 50 to the register 24 so that the information is set in the register 24. Specifically, an operator of the image-forming apparatus inputs the pulse generation intervals (periods) prd(1) through prd(n) and the numbers of pulses to be generated num(1) through num(n) of the external pulse trains xpls (xplsp or xplsm) using entry keys on the operation part 50. The CPU 30 sets the input set values prd(1) through prd(n) and num(1) through num(n) in the register 24.

The CPU 30 outputs phase delay control signals phsp(1) through phsp(n) for delaying the phase of the pixel clock signal clkw and phase advance control signals phsm(1) through phsm(n) for advancing the phase of the pixel clock signal clkw to the register 24 so that the external pulse trains xpls are output from the pulse train generator part 21.

The register 24, which is a storage medium temporarily storing the set values prd(1) through prd(n) and num(1) through num(n) set by the CPU 30, outputs the set values prd(1) through prd(n) and num(1) through num(n) to the pulse train generator part 21.

The register 24 also outputs the delay control signals phsp(1) through phsp(n) and the phase advance control signals phsm(1) through phsm(n) input by the CPU 30 to the pulse train generator part 21.

The register 24 also outputs a variety of information items used for image forming input by the CPU 30, such as information on dot processing and information specifying an image area based on printing paper size, to the image data processor part 23.

The printer controller 40 outputs image data in units of pages line by line (scan by scan) as an image signal (a video signal) to the image data processor part 23.

Figure 9:
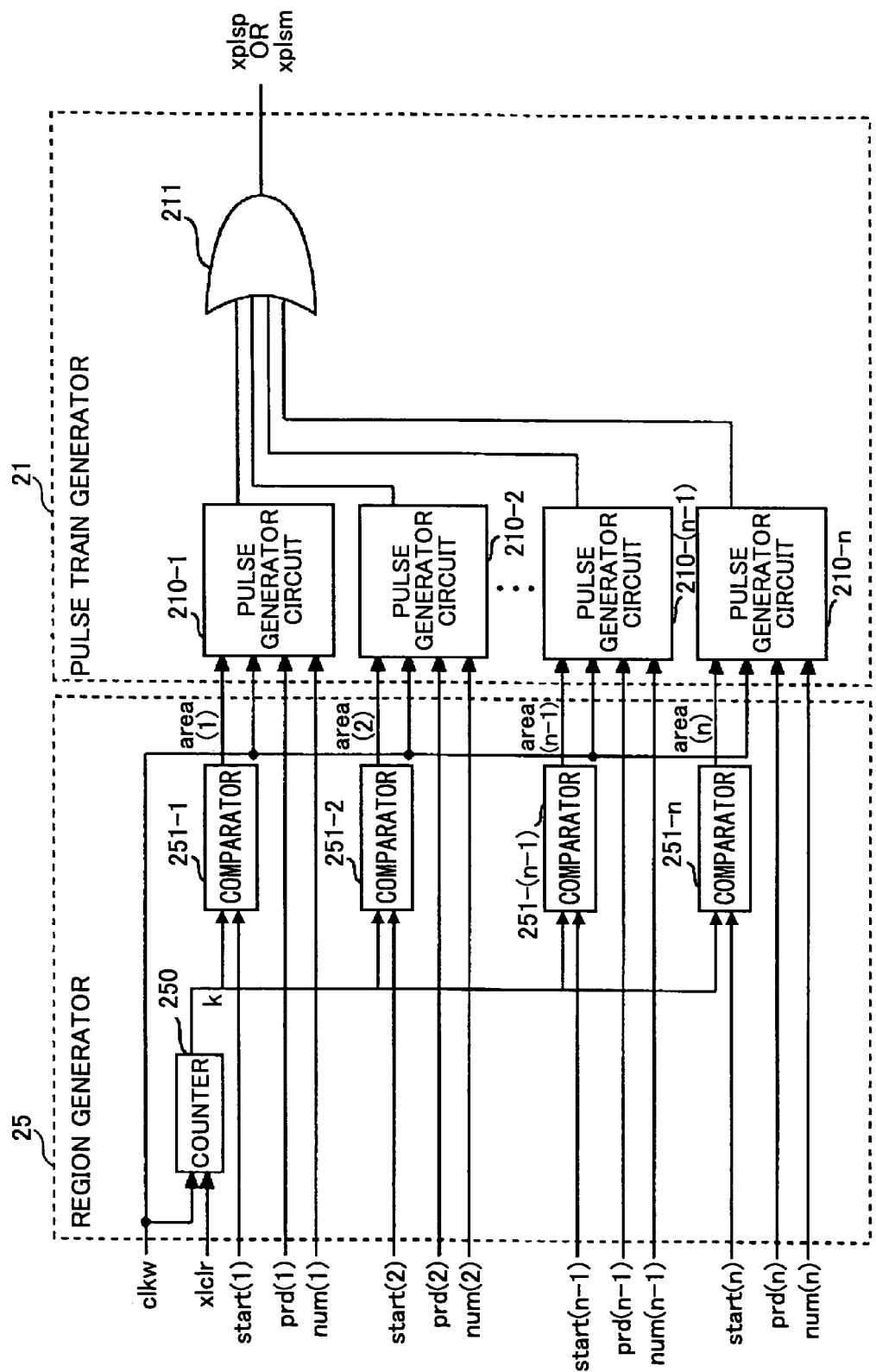
FIG. 9 is a block diagram showing more detailed configurations of a pulse train generator part and a region generator part according to the first embodiment of the present invention.

Next, a more detailed description is given, with reference to FIG. 9, of the configurations and operations of the pulse train generator part 21 and the region generator part 25 according to the first embodiment. FIG. 9 is a block diagram showing more detailed configurations of the pulse train generator part 21 and the region generator part 25 according to the first embodiment.

Referring to FIG. 9, the region generator part 25 includes a counter 250 and n comparators 251-1 through 251-n.

The clear signal xlclr generated from the synchronization detection signal detp by the clock generator part 22 is input to the counter 250. Then, the counter 250 counts the number of pulses of the pixel clock signal clkw using the point of the inputting of the clear signal xlclr as a reference point, and outputs a count value k. The count value k is used for dividing the period of a single scan by the polygon mirror into multiple periods and setting each of the multiple periods as a divided period.

The first through $n^{th}$ start point values of the first through $n^{th}$ divided periods are preset in the comparators 251-1 through 251-n, respectively. Each of the comparators 251-1 through 251-n compares its corresponding start point value with the count value k of the counter 250. When the count value k reaches the corresponding start point value, each of the comparators 251-1 through 251-n outputs a corresponding one of the first through $n^{th}$ area signals area(1) through area(n). The first through $n^{th}$ start point values of the first through $n^{th}$ divided periods are set by first through $n^{th}$ start signals start(1) through start(n) input to the comparators 251-1 through 251-n, respectively, from the CPU 30.

For instance, the comparator 251-1 compares the count value k of the counter 250 and the first start point value of the first divided period indicated by the first start signal start(1). When the count value k reaches the first start point value (start(1)), the comparator 251-1 outputs the first area signal area(1).

The pulse train generator part 21 starts to count the number of pulses of the pixel clock signal clkw in response to the inputting of the clear signal xlclr to the pulse train generator part 21. When the count value reaches the (preset) set value prd (indicating intervals at which the external pulses xpls are generated), the pulse train generator part 21 outputs the external pulse train xpls to the clock generator part 22. Thus, the pulse train generator part 21 can change the phase of the pixel clock signal clkw when the pulse train generator part 21 outputs the external pulse trains xpls. When the number of pulses of the output external pulse train xpls reaches the set value num (indicating the number of external train pulses [xpls] and represented by a positive integer), the pulse train generator part 21 stops generating the external pulse train xpls.

The pulse train generator part 21 includes n pulse generator circuits 210-1 through 210-n and an OR circuit 211.

Figure 10:
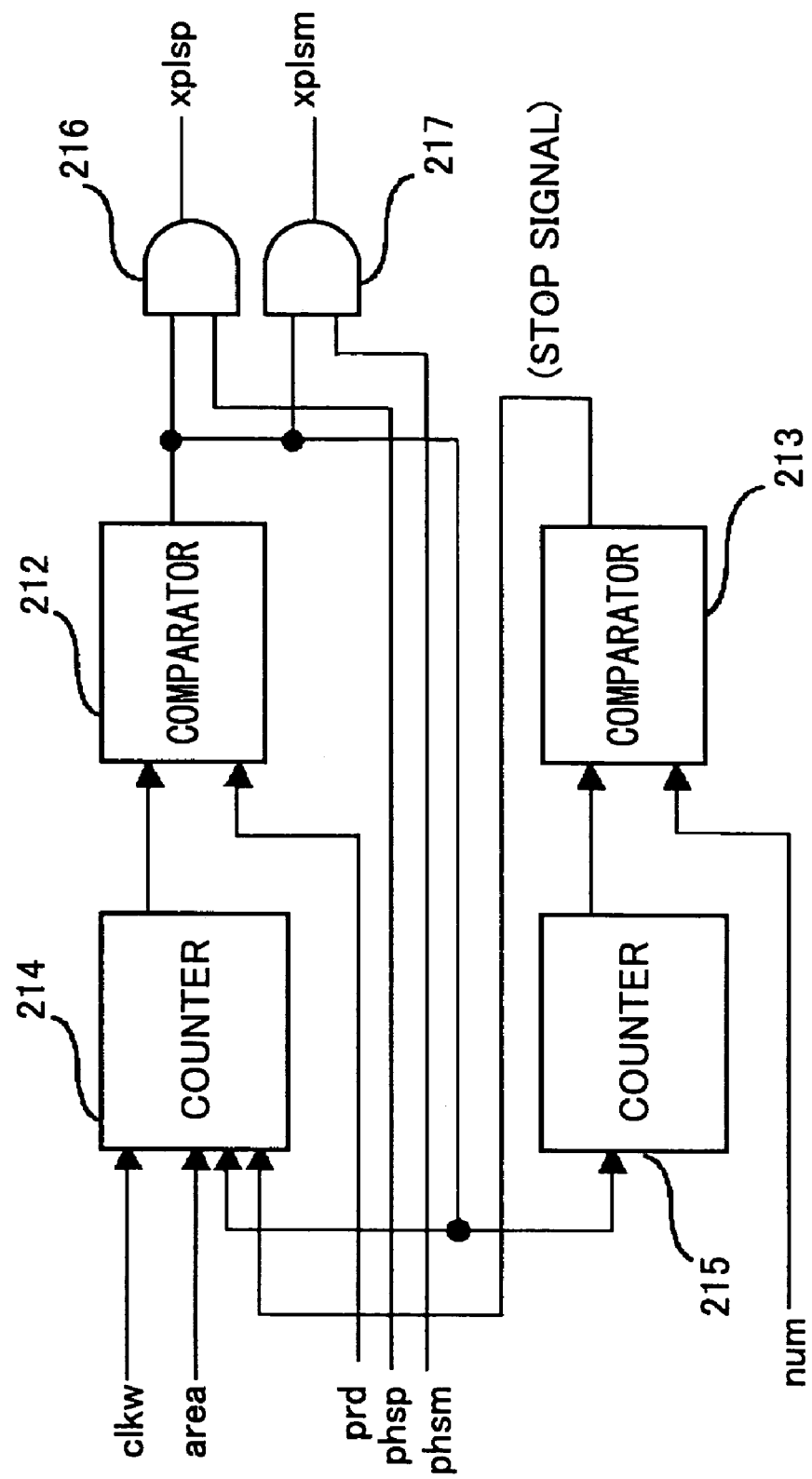
FIG. 10 is a block diagram showing a configuration of each of pulse generator circuits according to the first embodiment of the present invention.

Next, a description is given, with reference to FIG. 10, of the operation of generating external pulse trains by the pulse generator circuits 210-1 through 210-n. FIG. 10 is a block diagram showing a configuration of each of the pulse generator circuits 210-1 through 210-n according to the first embodiment.

Referring to FIG. 10, each of the pulse generator circuits 210-1 through 210-n includes comparators 212 and 213, counters 214 and 215, and AND circuits 216 and 217.

In each of the pulse generator circuits 210-1 through 210-n a corresponding one of the pulse generation intervals (periods) prd(1) through prd(n) is set in the comparator 212 and a corresponding one of the numbers of pulses num(1) through num(n) is set in the comparator 213 by an engine CPU (not graphically represented). As a result, each of the pulse generator circuits 210-1 through 210-n performs the following operation when the polygon mirror 13 causes a laser beam to perform a scan in the main scanning direction.

When a corresponding one of the area signals area(1) through area(n) is input to the counter 214, the counter 214 starts a counting operation to count the number of pulses of the pixel clock signal clkw (a count value i) using the point of the inputting of the area signal as a reference point. The counter 214 stops the counting operation when a stop signal is input thereto from the comparator 213.

The comparator 212 compares the count value i of the counter 214 and the pulse generation interval (set value) prd (the corresponding one of the pulse generation intervals prd(1) through prd(n)) preset therein, and outputs a pulse (xpls) to the AND circuits 216 and 217 every time the count value i reaches the set value prd.

When the pulse xpls and a corresponding one of the phase delay control signals phsp(1) through phsp(n) are input to the AND circuit 216, the AND circuit 216 outputs a pulse xplsp. When the pulse xpls and a corresponding one of the phase advance control signals phsm(1) through phsm(n) are input to the AND circuit 217, the AND circuit 217 outputs a pulse xplsm.

The counter 215 counts the number of pulses xpls output from the comparator 212 (a count value j).

The comparator 213 compares the count value j of the counter 215 and the number of pulses (set value) num (the corresponding one of the numbers of pulses num(1) through num(n)) preset therein. When the count value j reaches the set value num, the comparator 213 outputs the stop signal.

As described above, the pulse generation intervals (set values) prd(1) through prd(n), which may be any values, and the numbers of pulses (set values) num(1) through num(n), which may also be any values, are set in the corresponding pulse generator circuits 210-1 through 210-n.

When the external pulse train xpls (xplsp or xplsm) is input from any of the pulse generator circuits 210-1 through 210-n to the OR circuit 211, the OR circuit 211 directly outputs the input external pulse train xpls.

Figure 11:
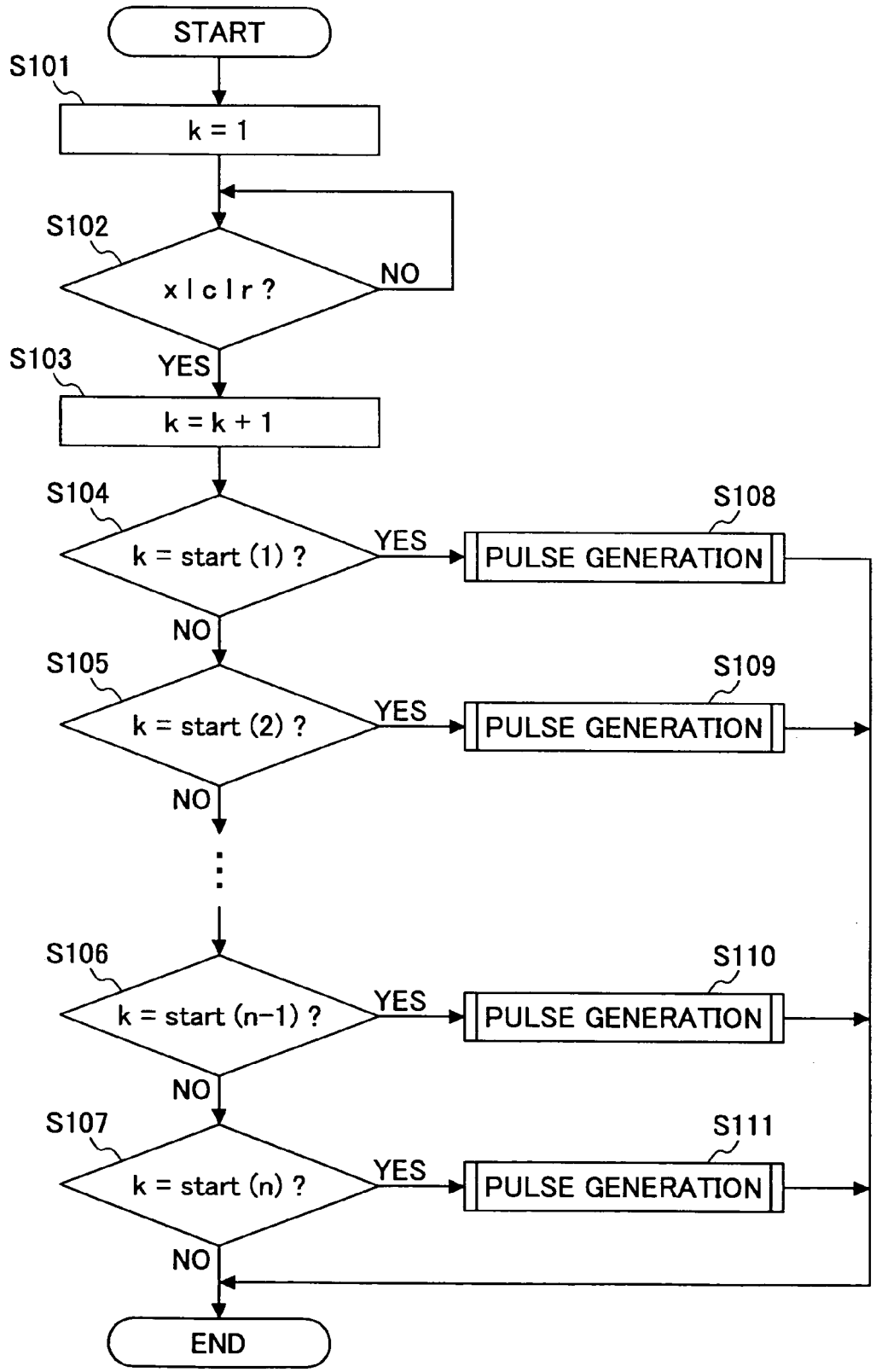
FIG. 11 is a flowchart of the operation of generating pulses by the pulse train generator part according to the first embodiment of the present invention.

Next, a detailed description is given, with reference to FIG. 11, of the operation of the pulse train generator part 21. FIG. 11 is a flowchart of the operation of generating pulses by the pulse train generator part 21 according to the first embodiment.

First, in step S101, when power is turned on, the counter 250 of the region generator part 25 resets the count value k to "1."

Thereafter, in step S102, it is determined whether the clear signal xlclr has been input to the counter 250. If the clear signal xlclr has been input to the counter 250 (that is, "YES" in step S102), in step S103, the counter 250 increments the count value k by one every time a pulse of the pixel clock signal clkw is input thereto. Next, when the count value k reaches the start point values of the divided periods (start(1) through start(n)) in steps S104 through S107, in steps S108 through S111, the corresponding comparators 251-1 through 251-n output the corresponding first through $n^{th}$ area signals area(1) through area(n). When the first through $n^{th}$ area signals area(1) through area(n) are input to the corresponding pulse generator circuits 210-1 through 210-n of the pulse train generator part 21, each of the pulse generator circuits 210-1 through 210-n performs a pulse generation operation.

In this case, first, the count value k of the counter 250 reaches the start point value start(1) of the first divided period, when the comparator 251-1 outputs the area signal area(1) to the pulse generator circuit 210-1. Then, the pulse generator circuit 210-1 performs the same operation as the above-described pulse generation operation using its internal components including the counters 214 and 215 (FIG. 10). As a result, the pulse generator circuit 210-1 generates the external pulse train xpls corresponding to the first divided period, and outputs the generated external pulse train xpls to the OR circuit 211. This external pulse train xpls is output via the OR circuit 211.

Next, the count value k of the counter 250 reaches the start point value start(2) of the second divided period, when the comparator 251-2 outputs the area signal area(2) to the pulse generator circuit 210-2. Then, the pulse generator circuit 210-2 performs the same operation as the above-described pulse generation operation using its internal components including the counters 214 and 215. As a result, the pulse generator circuit 210-2 generates the external pulse train xpls corresponding to the second divided period, and outputs the generated external pulse train xpls to the OR circuit 211. This external pulse train xpls is also output via the OR circuit 211.

Thereafter, the same process as described above is repeated until the external pulse train xpls corresponding to the $n^{th}$ (final) divided period is generated from the pulse generator circuit 210-n to be output via the OR circuit 211. Thus, finally, an external pulse train (final external pulse train) XPLS is output from the OR circuit 211.

Figure 12:
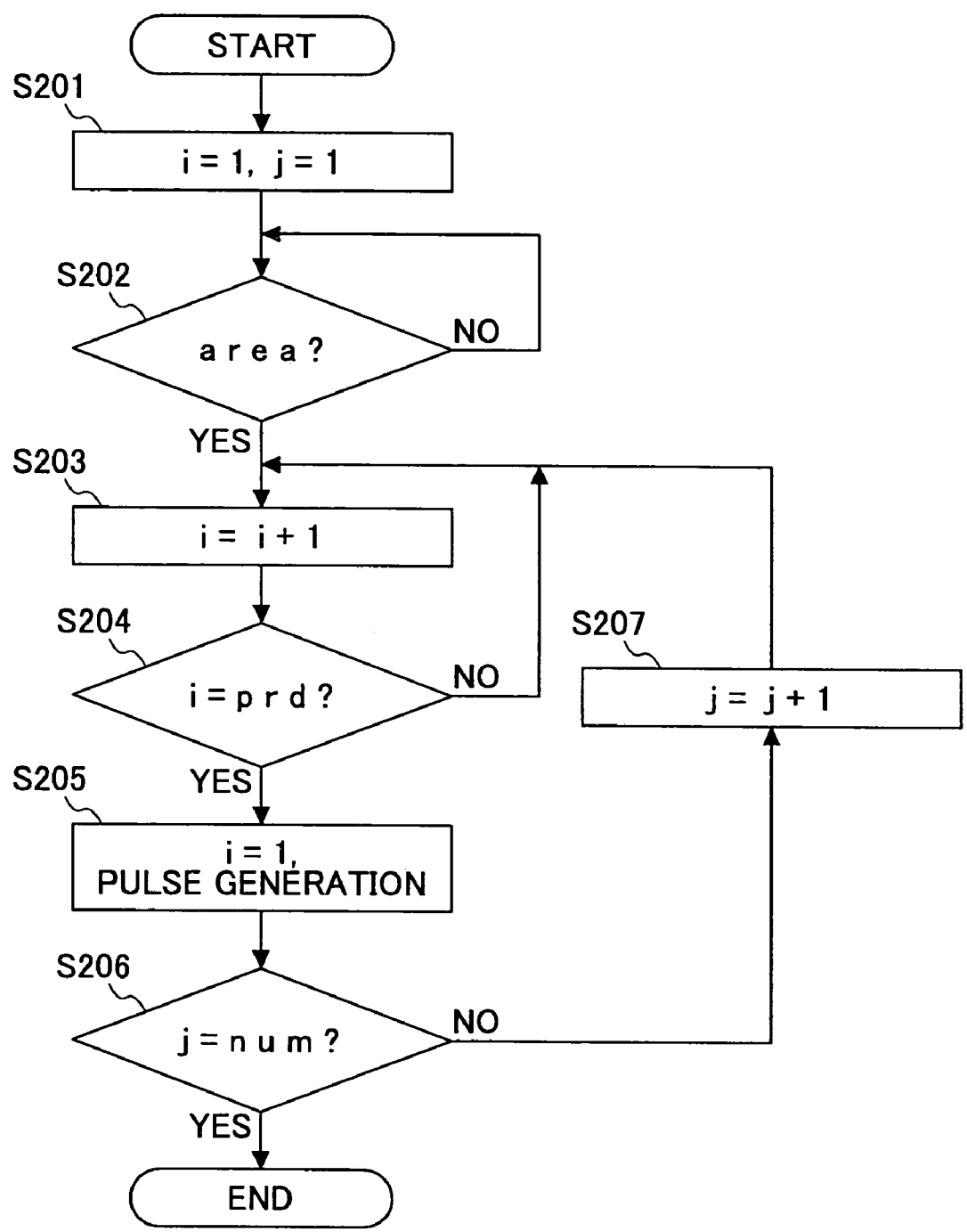
FIG. 12 is a flowchart of a pulse generation operation by each of the pulse generator circuits according to the first embodiment of the present invention.

Next, a description is given, with reference to FIG. 12, of the pulse generation operation by each of the pulse generator circuits 210-1 through 210-n according to the first embodiment. FIG. 12 is a flowchart of the pulse generation operation by each of the pulse generator circuits 210-1 through 210-n according to the first embodiment. The flowchart of FIG. 12 shows the operation of each of steps S108 through S111 of FIG. 11 in detail.

In step S201, when the pulse generator circuit 210 (indicating any of 210-1 through 210-n) is turned on, the counters 214 and 215 reset their respective count values i and j each to "1."

Thereafter, in step S202, it is determined whether a corresponding one of the area signals area(1) through area (n) has been input to the counter 214. If "NO" in step S202, the counter 214 waits until the corresponding area signal is input thereto. If it is determined the corresponding area signal has been input to the counter 214 (that is, "YES" in step S202), in step S203, the counter 214 increments the count value i by one every time a pulse of the pixel clock signal clkw is input thereto.

Then, in step S204, the comparator 212 determines whether the count value i has reached a corresponding one of the set values prd(1) through prd(n). If "NO" in step S204, the counter 214 increments the count value i by one. The counter 214 repeats the operation of step S203 until the count value i reaches the corresponding set value prd in step S204.

If the comparator 212 determines that the count value i has reached the corresponding set value prd (that is, "YES" in step S204), in step S205, the comparator 212 outputs a pulse xpls. The output pulse xpls is input to the counter 214 so that the count value i is reset to "1."

In step S206, the comparator 213 compares the count value j of the counter 215 and a corresponding one of the numbers of pulses num(1) through num(n), and determines whether the count value j has reached the corresponding set value num. If the count value j has not reached the corresponding set value num (that is, "NO" in step S206), in step S207, the counter 215 increments the count value j by one every time the pulse xpls is input thereto.

Thereafter, when the counters 214 and 215 repeat the above-described operations so that the count value j reaches the corresponding set value num (that is, "YES" in step S206), the comparator 213 generates and outputs a stop signal to the counter 214. As a result, the pulse generator circuit 210 stops the pulse generation operation.

Figure 13:
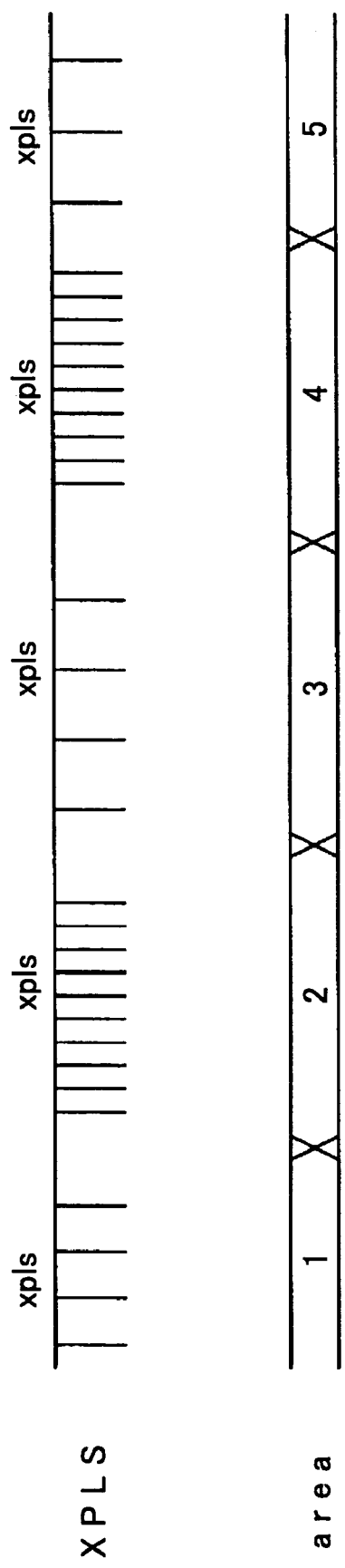
FIG. 13 is a diagram showing an external pulse train output from the pulse train generator part according to the first embodiment of the present invention.

As shown in FIG. 13, the external pulse train XPLS finally output from the pulse train generator part 21 includes the external pulse train xpls of each divided period (area) composed of any number of pulses.

According to this embodiment, the pulse train generator part 21 can generate any pulse train at any position in each area depending on settings (the set values prd and num). That is, a pulse train may be generated individually in each of multiple regions (areas), so that a partial magnification error in the main scanning direction can be corrected in each region (area).

The CPU 30 sets the start point values start(1) through start(n) in the register 24 so that an area larger in width in the main scanning direction is assigned to an image region having a greater deviation of writing magnification. That is, by setting a greater interval between a start point value for defining the start point of a first area and a start point value for defining the start point of a second area next to the first area, the first area can be set to be larger in width in the main scanning direction.

A large number of pulses xpls can be generated for an area having a large width. Accordingly, the range of correction of writing magnification can be widened. Meanwhile, a small number of pulses xpls is sufficient for an image region having a narrow range of correction of writing magnification. Accordingly, an area small in width may be assigned to such an image region.

For instance, an upper limit may be set to the number of pulses xpls assigned to a single area. In this case, the upper limit value may be preset in the register 24, and the CPU 30 may set the width of each area in the main scanning direction so that the number of pulses xpls assigned to each area does not exceed the upper limit value.

A method of measuring image writing magnification in the main scanning direction is described below.

Figure 14:
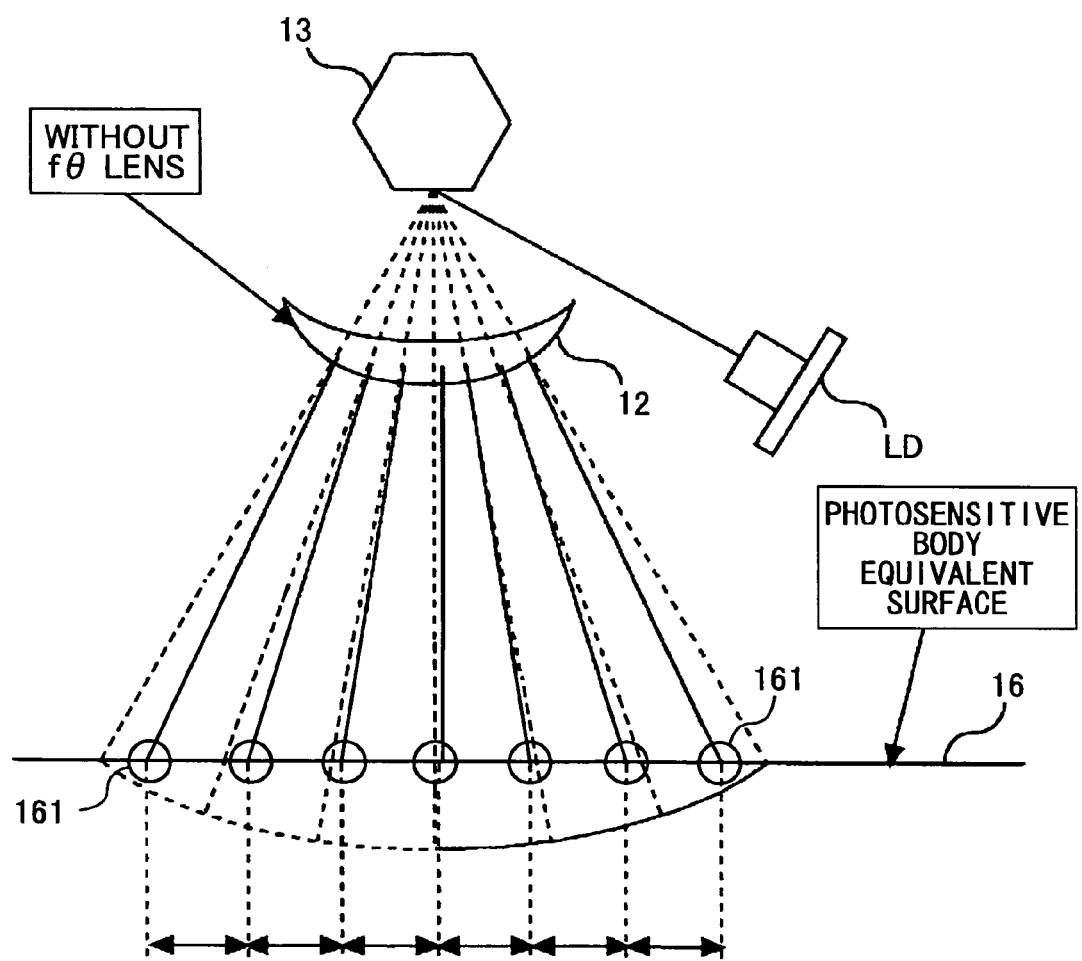
FIG. 14 is a schematic diagram showing an optical system unit and a unit measurement device according to the first embodiment of the present invention.

A description is given below, with reference to FIG. 14, of the operation of correcting image writing magnification in the main scanning direction before the shipment or assembly of the image-forming apparatus from or in a factory. FIG. 14 is a schematic diagram showing an optical system unit and a unit measurement device 16 according to the first embodiment.

Referring to FIG. 14, the optical system unit includes the laser light source LD, the fθ lens 12, and the polygon mirror 13.

The unit measurement device 16 is disposed so that its photosensitive body equivalent surface is located at the same position as that of the scanning surface of the photosensitive body 11 in the case of incorporating the optical system unit into the image-forming apparatus. Two or more position sensors 161 are equally spaced on the photosensitive body equivalent surface.

Figure 15:
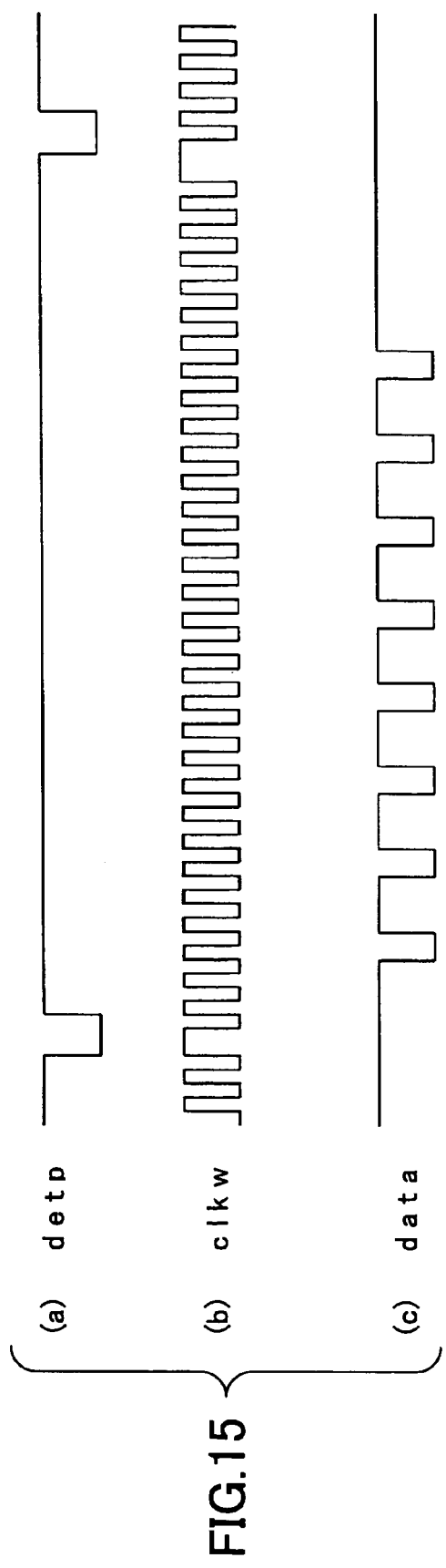
FIG. 15 is a timing chart of signals at the time of correcting writing magnification according to the first embodiment of the present invention.

FIG. 15 is a timing chart of signals at the time of correcting writing magnification according to the first embodiment.

Referring to FIG. 15, the laser light source driver 14 outputs pulses (data indicated by (c)) at equal intervals in accordance with the positions of the position sensors 161 in synchronization with the inputting of the synchronization detection signal detp indicated by (a). As a result, the laser beam enters each of the position sensors 161 disposed on the photosensitive body equivalent surface of the unit measurement device 16 via the fθ lens 12. In FIG. 15, (b) indicates the pixel clock signal clkw.

Figure 16A:
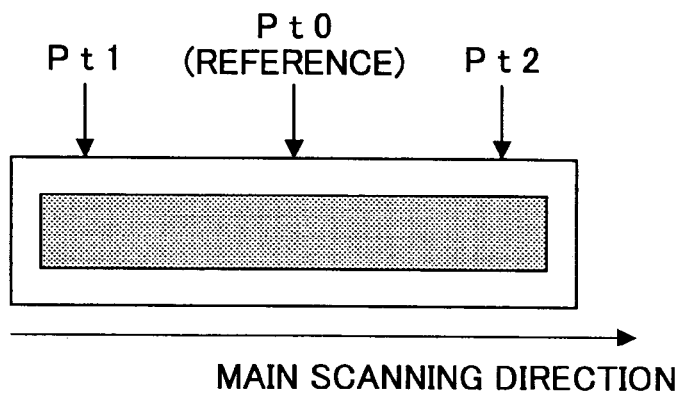
FIG. 16A is a diagram showing a position sensor.
Figure 16B:
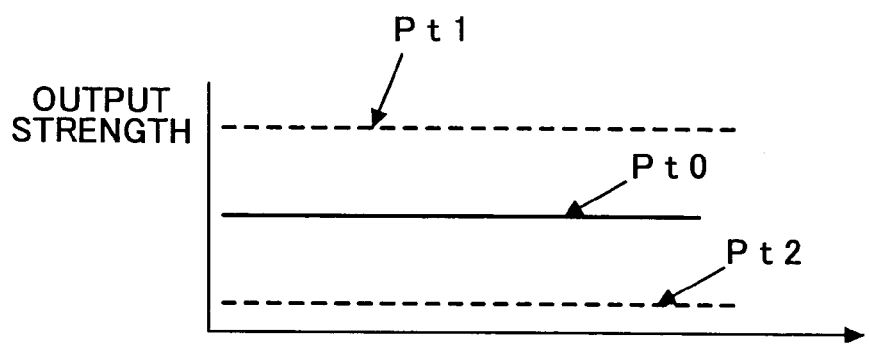
FIG. 16B is a graph showing signals output from the position sensor.

FIG. 16A is a diagram showing one of the position sensors 161 according to the first embodiment. FIG. 16B is a graph showing signals output from the position sensor 161 when the position sensor 161 detects a laser beam at detection positions Pt0, Pt1, and Pt2, respectively, on its detection surface.

In FIGS. 16A and 16B, the detection point Pt0 is positioned at the middle point of the length of the detection surface of the position sensor 161 in the main scanning direction. That is, when the laser beam is received at the detection position Pt0, an error in (a correction of) image writing magnification in the main scanning direction is zero.

When the laser beam is detected at the detection position Pt1, which is on the end side of the photosensitive body equivalent surface in the main scanning direction, the image writing magnification in the main scanning direction is lower than a normal value (an image is dense).

When the laser beam is detected at the detection position Pt2, which is on the center side of the photosensitive body equivalent surface in the main scanning direction, the image writing magnification in the main scanning direction is higher than a normal value (an image is sparse).

As shown in FIG. 16B, the unit measurement device 16 can calculate a correction at each detection position by detecting the difference in signal output strength from the signal output strength at the detection position Pt0.

FIGS. 16A and 16B show an example of the relationship between laser beam receiving positions and outputs, which may be determined in another way.

Figure 17:
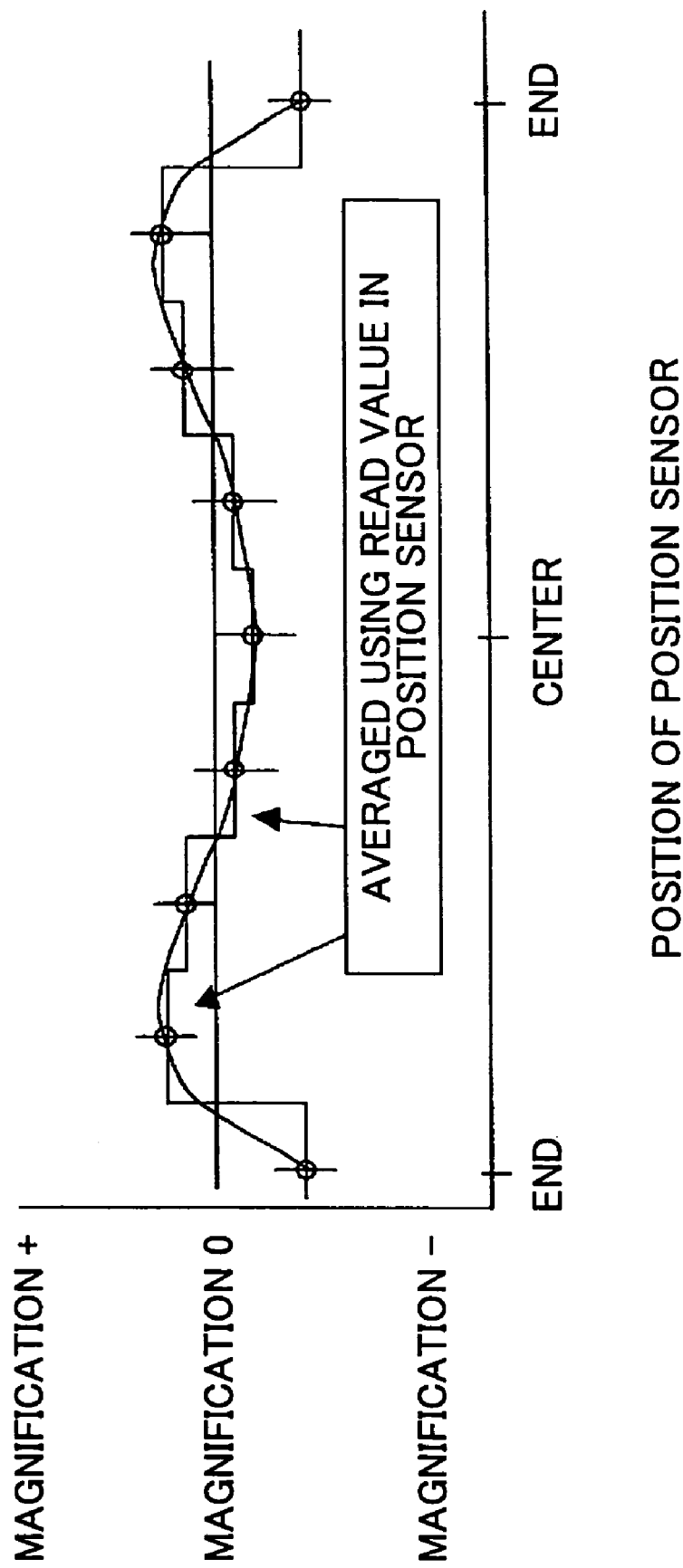
FIG. 17 is a graph showing writing magnification deviations in the position sensors calculated based on the light receiving positions thereof according to the first embodiment of the present invention.

FIG. 17 is a graph showing writing magnification deviations in the position sensors 161 calculated based on the light receiving positions of the position sensors 161 according to the first embodiment.

In FIG. 17, a positive (+) magnification indicates that laser beam receiving positions are widely spaced on the photosensitive body equivalent surface, and a negative (−) magnification indicates that laser beam receiving positions are narrowly spaced on the photosensitive body equivalent surface.

FIG. 17 shows the outputs of the position sensors 161 when the number of position sensors 161 disposed on the photosensitive body equivalent surface is nine.

The output (magnification deviation) of each position sensor 161 is extended in the main scanning direction using the position of the position sensor 161 as a reference. The output of each position sensor 161 is regarded as an average sensor output in a region (an area) including and around the position of the position sensor 161. Then, the outputs of the position sensors 161 are connected as steps as shown in FIG. 17. That is, the magnification deviations in each region (area) are averaged using a read value in the corresponding position sensor 161. Each position sensor output is employed as a correction value (a coefficient for calculation) for the corresponding area.

Figure 18:
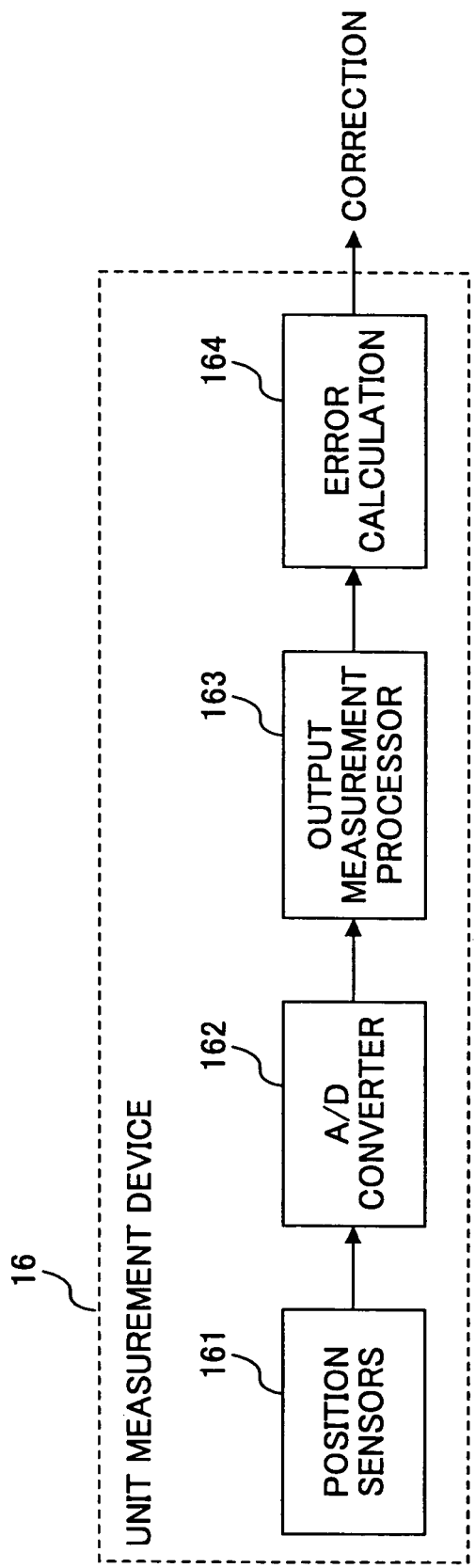
FIG. 18 is a block diagram showing the unit measurement device according to the first embodiment of the present invention.

FIG. 18 is a block diagram showing the unit measurement device 16 according to the first embodiment. Referring to FIG. 18, the unit measurement device 16 includes the position sensors 161, an analog-to-digital (A/D) converter 162, an output measurement data processor part 163, and an error calculation part 164.

Each position sensor 161 outputs an output signal of a strength corresponding to its detection position as shown in FIG. 16B to the A/D converter 162.

The A/D converter 162 converts the analog signal input from each position sensor 161 to a digital signal, and outputs the converted signal to the output measurement data processor part 163.

The output measurement data processor part 163, based on the digital signal output from the A/D converter 162, calculates a deviation from the detection position Pt0 in each position sensor 161, and outputs the calculated deviation to the error calculation part 164.

Pulses xpls may be inserted in a direction to reduce the deviation calculated in the output measurement data processor part 163 to zero. Therefore, the error calculation part 164 divides the deviation calculated in the output measurement data processor part 163 by units of pulse increase (clko), and calculates a correction (the number of pulses clko and a phase direction [delaying or advancing control]) for each area.

Figure 16C:
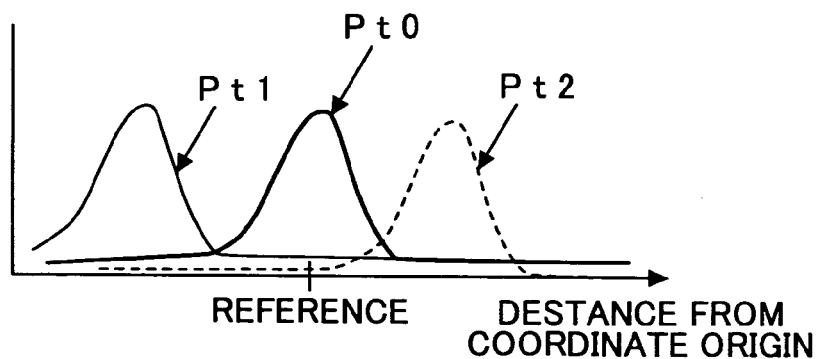
FIG. 16C is a graph showing output signals in the case of using a charge-coupled device according to the first embodiment of the present invention.

FIG. 16C is a graph showing output signals according to light beam reception in the case of using a charge-coupled device (CCD) instead of the position sensors 161 according to the first embodiment. FIG. 16C shows signals output from the CCD when the CCD receives a light beam at detection positions Pt0, Pt1, and Pt2, respectively, on its light receiving surface.

As shown in FIG. 16C, the CCD outputs pulse waveforms in accordance with laser beam detection positions. Accordingly, as in the case of the position sensors 161, an output signal of the CCD may be converted to a digital signal in the A/D converter 162, and is subjected to peak detection by the output measurement data processor part 163 so that its peak position is calculated. As a result, the position of the output signal is obtained. Then, the error calculation part 164 calculates a correction.

FIG. 19 is a table of corrections of image writing magnification in the main scanning direction and correction coefficients according to the first embodiment. According to this embodiment, a correction of image writing magnification in the main scanning direction and a correction coefficient are determined for each area as shown in FIG. 19. In FIG. 19, specific values are not shown for convenience of description. In the case of FIG. 19, an image region on the photosensitive body 11 is divided into 11 areas (area 0 through area 10) in the main scanning direction.

Here, a description is given of a method of calculating a correction coefficient in each area.

First, the corrections of all the areas are summed up.

Next, the correction of each area is divided by the sum of the corrections, so that the quotient is determined as the correction coefficient of the area.

The correction and the correction coefficient of each area thus obtained may be prestored in the register 24 in units of optical units when one or more optical units are incorporated into the image-forming apparatus. The image-forming apparatus may include multiple optical units. The correction and the correction coefficient of each area may be stored in another storage part connected to the CPU 30 than the register 24, such as an EEPROM or a battery-backed-up NVRAM (not graphically represented). In the case of storing the corrections and the correction coefficients thus in a storage part connected to the CPU 30, the CPU 30 may read out the corrections from the storage part such as the register 24 when power is on, and may set the set values prd, num, start, and phsp (or phsm) in the register 24 based on the corrections.

Alternatively, character or image information showing the corrections and the correction coefficients of each optical unit may be printed on recording means such as a seal and applied on the optical unit. In the case of using a seal, the corrections and the correction coefficients are input manually to the storage part such as the register 24 through the operation part 50.

If the image-forming apparatus includes a scanner such as a bar code reader, the information indicating the corrections and the correction coefficients on the seal may be provided in the form of a bar code.

The calculated corrections serve as initial correction values that are corrections at the time of incorporating the optical units into the image-forming apparatus.

If there occurs a change over time in the characteristic of an optical system, it is necessary to adjust the corrections employed in the image-forming apparatus at this point. In this case, the correction of a certain area may be adjusted, and a new correction value (NC) may be calculated for each of the other areas (AREA) from the following expression:

NC=(Initial correction value of AREA)×(Correction coefficient of AREA)÷(Correction coefficient of the certain area).

At the time of assembling the image-forming apparatus, corrections and correction coefficients as shown in FIG. 19 are set therein. Based on the corrections, the pulse train generator part 21 outputs external pulse trains xpls and control image writing magnification. Thereafter, if the characteristic of the fθ lens 12 changes over time, this causes the image writing magnification to change.

Next, a description is given, with reference to FIG. 20, of the operation of correcting an error in image writing magnification in the main scanning direction due to an environmental variation over time in the image-forming apparatus. FIG. 20 is a diagram showing the photosensitive body 11 and the position detection sensors 17 according to the first embodiment.

Referring to FIG. 20, the five position detection sensors 17 are disposed opposite the scanning surface of the photosensitive body 11, being spaced equally.

Further, the laser light source LD emits a light beam in accordance with the disposition of the position detection sensors 17 so as to form the image of a pattern for detection (a detection pattern) on the photosensitive body 11.

Figure 21:
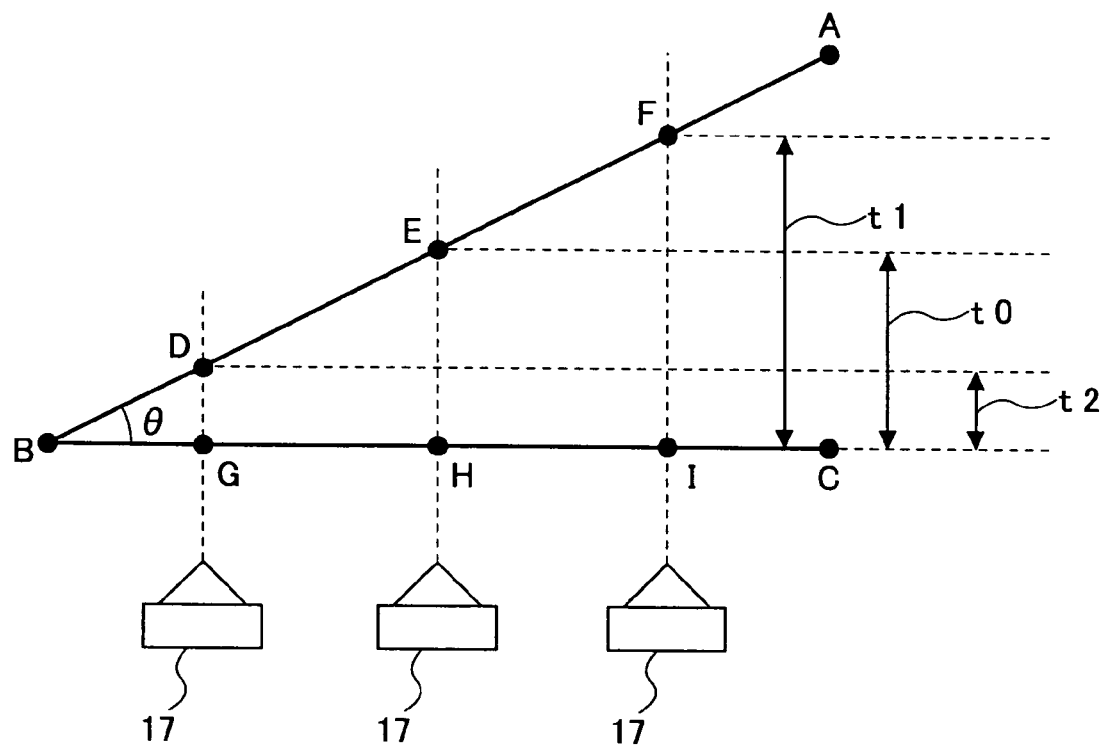
FIG. 21 is a diagram showing a method of detecting a detection pattern by the position detection sensors according to the first embodiment of the present invention.

FIG. 21 is a diagram showing a method of detecting a detection pattern by the position detection sensors 17 according to the first embodiment. The image data of the detection pattern may be stored in, for instance, a ROM (not graphically represented). The printer controller 40 may read the image data of the detection pattern from the ROM and output the read image data to the image data processor part 23.

As shown in FIG. 21, according to the first embodiment, each position detection sensor 17 reads the detection pattern (or a corresponding individual detection pattern image) formed of a segment AB (an oblique line) and a segment BC (a horizontal line) that are not parallel to each other from the segment BC side to the segment AB side. The segments AB and BC form an angle θ. For instance, the segment BC may be formed to be parallel to the main scanning direction.

The shape of the detection pattern is not limited to that of FIG. 21.

When image writing magnification includes no error, each position detection sensor 17 reads the detection pattern from a point H on the segment BC toward a point E on the segment AB (for instance, in the direction reverse to the sub scanning direction). At this point, a time that elapses after reading the point H before reading the point E is defined as a time t0. Data representing the time t0 and the angle θ may be prestored in the register 24.

If an error occurs in image writing magnification, the time from the detection of the segment BC up to the detection of the segment AB changes from the time t0.

For instance, if image writing magnification becomes lower so that the detection pattern shifts toward left in FIG. 21, the position detection sensor 17 reads the detection pattern from a point I on the segment BC toward a point F on the segment AB. If a time that elapses after reading the point I before reading the point F is defined as a time t1, t1 is longer than t0 (t1>t0). Data representing the time t1 is input from the position detection sensor 17 to the CPU 30, and the CPU 30 reads out the data representing the time t0 and the angle θ from the register 24. Then, the CPU 30 calculates a time (t1−t0)×cot θ that is an error. In this case, the error in writing magnification can be corrected by delaying the phase of the pixel clock signal clkw for image writing by the time (t1−t0)×cot θ.

Further, by dividing the time (t1−t0)×cot θ by a unit of clock phase change (=one period of the pixel clock signal clkw×⅛ in FIG. 8), the CPU 30 can calculate a change in the number of pulses from a pulse train based on the correction currently applied in the image-forming apparatus. That is, the CPU 30 can calculate the number of pulses clko by which the phase of the pixel clock signal clkw is to be advanced or delayed. The CPU 30 sets the set values (prd, num, start, and phsp or phsm) in the register 24 based on each calculated correction, and the image-forming apparatus forms an image based on the set values.

If image writing magnification becomes higher so that the detection pattern shifts toward right in FIG. 21, the position detection sensor 17 reads the detection pattern from a point G on the segment BC toward a point D on the segment AB. If a time that elapses after reading the point G before reading the point D is defined as a time t2, t2 is shorter than t0 (t2<t0). Data representing the time t2 is input from the position detection sensor 17 to the CPU 30, and the CPU 30 reads out the data representing the time t0 and the angle θ from the register 24. Then, the CPU 30 calculates a time (t0−t2)×cot θ that is an error. In this case, the error in writing magnification can be corrected by advancing the phase of the pixel clock signal clkw for image writing by the time (t0−t2)×cot θ.

Further, by dividing the time (t0−t2)×cot θ by the unit of clock phase change (=one period of the pixel clock signal clkw×⅛ in FIG. 8), the CPU 30 can calculate a change in the number of pulses from a pulse train based on the correction currently applied in the image-forming apparatus. That is, the CPU 30 can calculate the number of pulses clko by which the phase of the pixel clock signal clkw is to be advanced or delayed. The CPU 30 sets the set values (prd, num, start, and phsp or phsm) in the register 24 based on each calculated correction, and the image-forming apparatus forms an image based on the set values.

In the above-described case, the detection pattern is formed on the photosensitive body 11. Alternatively, the detection pattern may also be formed on a transfer belt or transfer paper.

In the case of forming an image with multiple colors, in the image-forming apparatus, detection patterns may be written onto a transfer belt or transfer paper with multiple colors as shown in FIG. 20, and a relative error between positions at which the colored detection patterns are formed may be detected. In this case, first, a detection pattern of a reference color as shown in FIG. 20 is formed and measured. Then, detection patterns of other colors to be detected are written and detected. Next, at the formation position of each of the detection patterns of the other colors, the image-forming apparatus measures a difference from the formation position of the detection pattern of the reference color. As a result, a relative offset (misregistration) between the image of the reference color and the image of each of the other colors can be obtained. The image-forming apparatus performs correction so as to reduce the relative offsets to zero.

When the CPU 30 calculates new corrections (set values prd, num, start, and phsp or phsm) in response to an environmental change over time, the newly calculated corrections are stored in a storage part such as the register 24.

Even when the newly calculated corrections are stored in, for instance, the register 24, the initial correction values and the correction values calculated at the preceding time are prevented from being erased, and are retained as they are.

The results of the measurement of image writing magnification are often affected by the ambient conditions of image formation, such as a decrease in toner density, a periodic variation in a photosensitive body, and a variation in motor speed. Accordingly, if a component of the image-forming apparatus malfunctions, inappropriate values may be newly set as correction values.

In this case, the CPU 30 replaces the newly set correction values with the initial correction values, which are the results of accurate measurement in a factory. As a result, the image-forming apparatus can correct image writing magnification appropriately.

The image-forming apparatus may perform error detection in measuring a writing magnification error. That is, when the difference between a current error measurement and a preceding error measurement is greater than or equal to a certain value, the current error measurement is regarded as impossible and determined as error.

Further, a case where no writing magnification error is detectable (normal formation of a detection pattern is prevented) is also determined as error.

Figure 22:
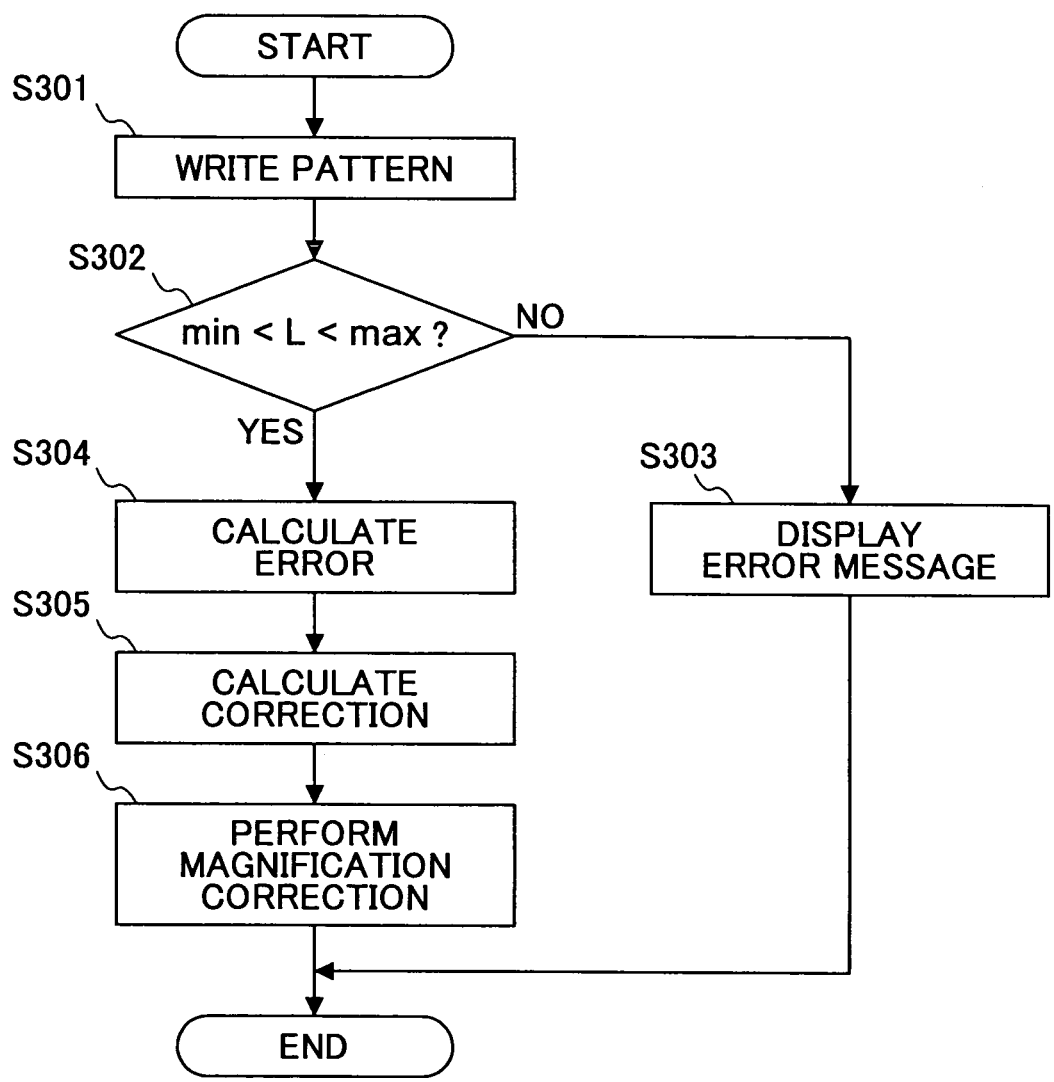
FIG. 22 is a flowchart of error detection by the image-forming apparatus according to the first embodiment of the present invention.

A description is given below, with reference to FIG. 22, of the error detection according to the first embodiment. FIG. 22 is a flowchart of the error detection by the image-forming apparatus according to the first embodiment.

First, in step S301, the laser light source LD forms the image of the above-described detection pattern on the photosensitive body 11.

Next, in step S302, the position detection sensor 17 (one of the position detection sensors 17) measures the length L in the main scanning direction (the length of the segment BC in this embodiment) of the detection pattern (a corresponding individual detection pattern image) on the photosensitive body 11. Receiving data representing the length L from the position detection sensor 17, the CPU 30 reads out from the register 24 a minimum (min) and a maximum (max) that are thresholds for determining whether the detection pattern is normally formed on the photosensitive body 11, and determines whether the length L satisfies min<L<max. Here, the values min and max are prestored in the register 24.

If it is determined in step S302 that L≦min or max≦L (that is, "NO" in step S302), in step S303, a message to the effect that a measured writing magnification error is erroneous is displayed on a display (not graphically represented), and the CPU 30 replaces the correction in the register 24 with a previously set correction or the initial correction value. The image-forming apparatus performs an image-forming operation with the previously set correction or the initial correction value.

If it is determined in step S302 that min<L<max (that is, "YES" in step S302), in step S304, the CPU 30 performs the above-described error calculation operation.

Next, in step S305, the CPU 30 calculates a correction (or set values) based on the calculated error.

Next, in step S306, the image-forming apparatus performs the writing magnification correction operation shown in FIG. 11, and ends the operation.

As describe above, according to this embodiment, an image region on the photosensitive body 11 is divided in the main scanning direction into a predetermined number of areas, and the pulse train generator part 21 may change the phase of a clock signal for image writing (the pixel clock signal clkw) area by area.

As a result, even if a writing magnification error occurs on the photosensitive body 11 because of the lens characteristic of the fθ lens 12, the laser light source LD can form an image so that the writing magnification is constant in the main scanning direction on the photosensitive body 11.

Further, according to this embodiment, as the number of pulses xpls for changing the phase of the pixel clock signal clkw becomes larger in each area, the region generator part 25 may output the area signal area to widen the width of the area to the pulse train generator part 21.

Accordingly, even when the number of pulses xpls to be assigned to a predetermined area is larger than or equal to a predetermined number, it is possible to appropriately change the phase of the pixel clock signal clkw by setting a greater width for the area.

Further, according to this embodiment, the unit measurement device 16 measures the writing magnification of each area of an image in the main scanning direction on its photosensitive body equivalent surface, and calculates a correction for the area. Each calculated correction is stored in a storage part such as the register 24. At the time of forming the image, the CPU 30 reads out the corrections stored in the register 24. The pulse train generator part 21 generates pulses based on the corrections so as to adjust image writing magnifications in the main scanning direction on the photosensitive body 11.

As a result, the laser light source LD can form an image so that the writing magnification is constant in the main scanning direction on the photosensitive body 11.

Further, according to this embodiment, the unit measurement device 16 measures the writing magnification of each area of an image in the main scanning direction on the photosensitive body equivalent surface and calculates corrections optical unit by optical unit.

As a result, an optimum optical scanner adapted to the characteristic (fθ lens) of each optical unit can be provided.

Further, according to this embodiment, each of the position detection sensors 17 measures the length in a predetermined direction of a corresponding detection pattern (image) formed on, for instance, the photosensitive body 11, and outputs the result of the measurement to the CPU 30. The CPU 30 changes a correction of image writing magnification in each area based on the corresponding measurement result, and performs correction.

As a result, even if the lens characteristic of the fθ lens 12 changes over time, the laser light source LD can form an image so that the writing magnification is constant in the main scanning direction on the photosensitive body 11.

Further, according to this embodiment, each of the position detection sensors 17 reads the length in a predetermined direction of a corresponding detection pattern (image) formed on, for instance, the photosensitive body 11, and outputs the result of the measurement to the CPU 30. If the read length of the corresponding detection pattern does not fall within a predetermined range, the CPU 30 determines a measured writing magnification error as erroneous to display an error message, and is prevented from changing a correction.

As a result, the laser light source LD can form an image on the photosensitive body 11 with a suitable correction. In the case of determining a measured writing magnification error as erroneous, the laser light source LD forms an image on the photosensitive body 11 using a preceding correction or a correction set as an initial value. As a result, even if a component of the image-forming apparatus malfunctions at the time of detecting a detection pattern, the laser light source LD can form an image with a suitable correction.

[Second Embodiment]

Figure 23:
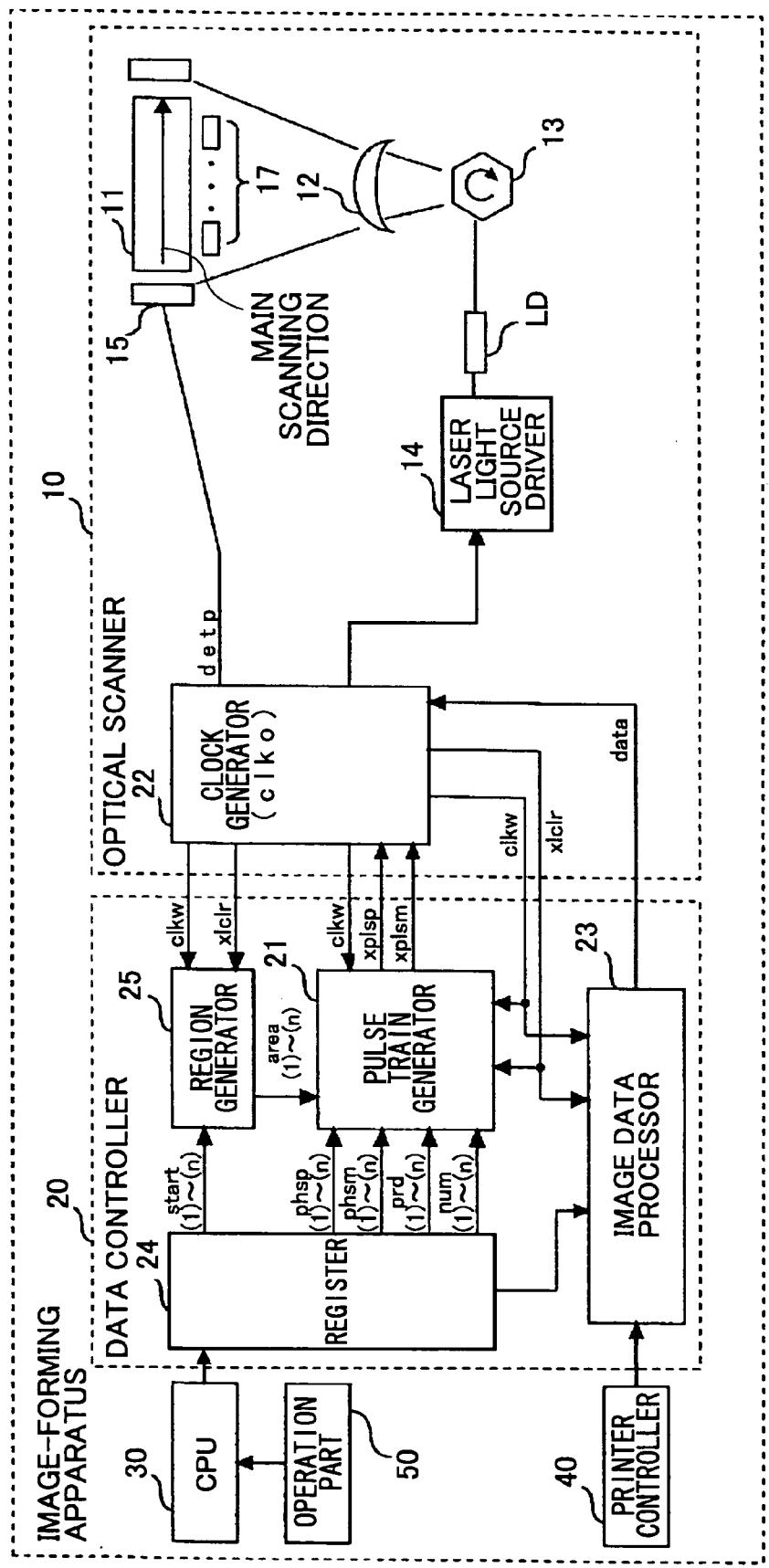
FIG. 23 is a block diagram showing an image-forming apparatus according to a second embodiment of the present invention.

Next, a description is given, with reference to FIG. 23, of the configuration and the operation of an image-forming apparatus according to the second embodiment of the present invention. FIG. 23 is a block diagram showing the image-forming apparatus according to this embodiment. The image-forming apparatus of the second embodiment may be equal in configuration and operation to the image-forming apparatus of the first embodiment unless otherwise specified. In the second embodiment, the same elements as those of the first embodiment are referred to by the same numerals.

Referring to FIG. 23, the image-forming apparatus includes the optical scanner 10, the data controller 20, the CPU 30, the printer controller 40, and the operation part 50 as an input part. The actual configuration of the image-forming apparatus is shown simplified in FIG. 23. The image-forming apparatus may have components other than those shown in FIG. 23.

The optical scanner 10, which forms an image using a laser beam, includes the photosensitive body 11 as a medium to be scanned, the fθ lens 12, the polygon mirror 13 as a rotary deflector, the laser light source driver 14, the synchronization detection part 15 as a synchronization detector, the position detection sensors 17, and the laser light source LD.

The data controller 20 outputs an image signal for controlling the laser light source driver 14 so as to control a laser beam writing operation by the optical scanner 10. The data controller 20 includes the pulse train generator part 21 as a phase control part, the image data processor part 23, the register 24, and the region generator part 25.

The CPU 30 functions as a scanning time comparison part and a set value calculation part.

The second embodiment is different from the first embodiment in that the clock generator part 22 is provided in the optical scanner 10 and that an image data signal output from the image data processor part 23 is input to the laser light source driver 14 via the clock generator part 22.

According to the image-forming apparatus of each of the above-described embodiments, in the case of setting a wide correction range of writing magnification for an area, a large width is assigned to the area, and in the case of setting a narrow correction range of writing magnification for an area, a small width is assigned to the area.

[Third Embodiment]

Figure 24:
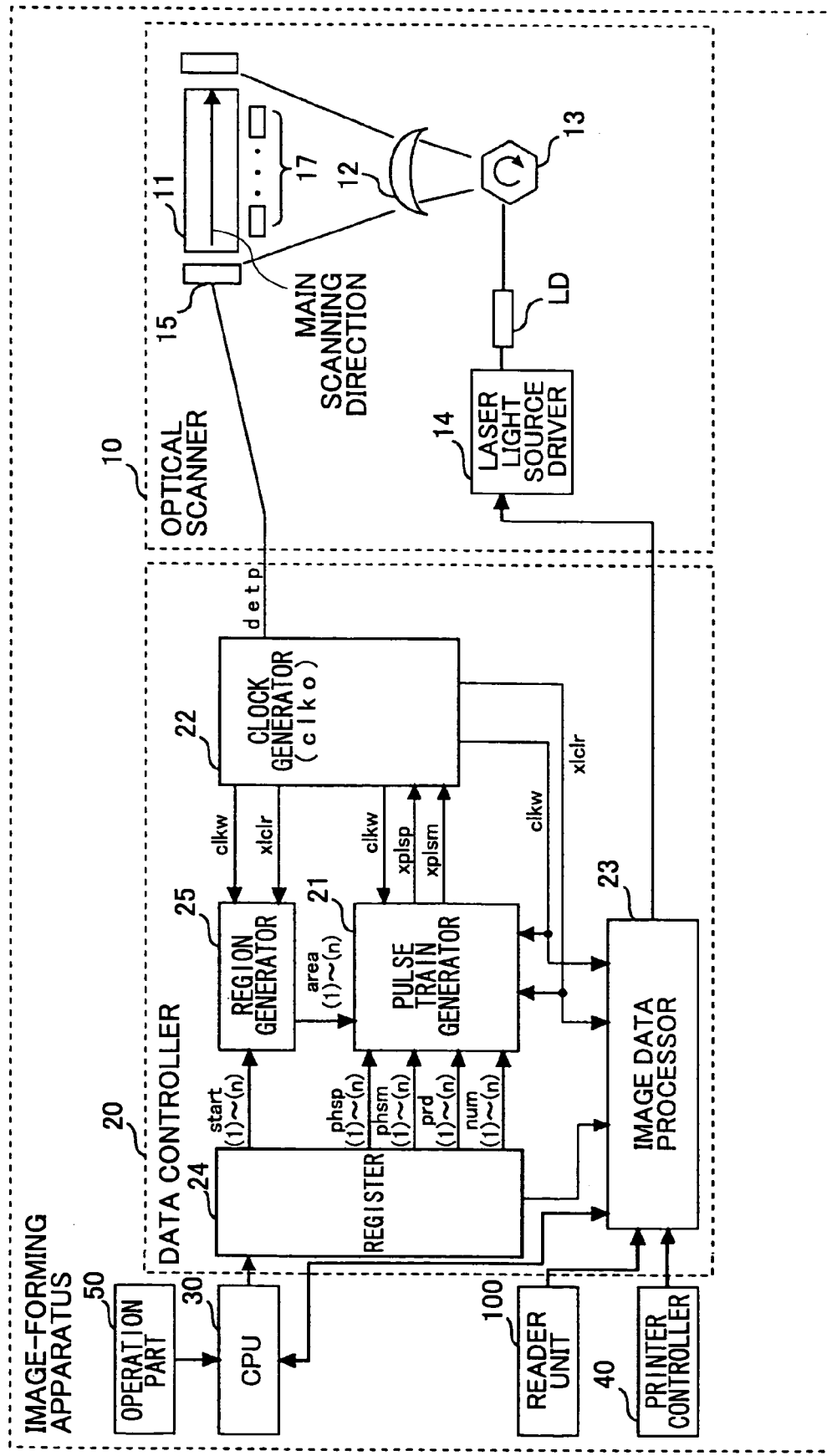
FIG. 24 is a block diagram showing an image-forming apparatus according to a third embodiment of the present invention.

Next, a description is given, with reference to FIG. 24, of the configuration of an image-forming apparatus according to a third embodiment of the present invention. FIG. 24 is a block diagram showing the image-forming apparatus according to the third embodiment. In the third embodiment, the same elements as those of the first and second embodiments are referred to by the same numerals.

The image-forming apparatus may be, for instance, a printer, a copier, or a facsimile machine.

Referring to FIG. 24, the image-forming apparatus includes the optical scanner 10, the data controller 20, the CPU 30, the printer controller 40, the operation part 50 as an input part, and a reader unit 100. The actual configuration of the image-forming apparatus is shown simplified in FIG. 24. The image-forming apparatus may have components other than those shown in FIG. 24.

The optical scanner 10, which forms an image using a laser beam, includes the photosensitive body 11 as a medium to be scanned, the fθ lens 12, the polygon mirror 13 as a rotary deflector, the laser light source driver 14, the synchronization detection part 15 as a synchronization detector, the position detection sensors 17, and the laser light source LD.

The laser light source LD is a device that emits a laser beam. The laser light source LD may be, for instance, a light-emitting semiconductor device such as a laser diode.

The photosensitive body 11 has its scanning surface (surface to be scanned) formed of a material whose electric characteristics change by exposure to light (a layer of an optical semiconductor). The photosensitive body 11 may be, for instance, a photosensitive body drum rotating in the sub scanning direction.

The fθ lens 12 causes a laser beam deflected by the polygon mirror 13 to form an image on the scanning surface of the photosensitive body 11. The fθ lens 12 deflects a laser beam of a particular wavelength at a predetermined angle of refraction.

The polygon mirror 13, which has a polygonal prism shape, is rotated at uniform velocity by a motor (not graphically represented). With its rotation, the polygon mirror 13 successively changes the angle of reflection of the laser beam emitted from the laser light source LD to be incident on the polygon mirror 13 so that the laser beam performs scanning on the scanning surface of the photosensitive body 11 in the main scanning direction.

The laser light source driver 14, which drives the laser light source LD, operates according to an image signal provided from the data controller 20. More specifically, after a predetermined period of time passes since the synchronization detection part 15 detects a laser beam and inputs a synchronization detection signal detp to the data controller 20, the laser light source driver 14 starts to control modulation (switching on and off) of the laser light source LD according to the image signal provided from the data controller 20, and causes the laser light source LD to emit a laser beam correspondingly. As a result, even if there is a division angle error between the reflecting surfaces of the polygon mirror 13, writing start positions can be aligned at the same position in the main scanning direction on the scanning surface, and writing end positions can be aligned at the same position in the main scanning direction on the scanning surface.

The synchronization detection part 15 is provided outside the image region of the scanning surface of the photosensitive body 11 on a laser beam passage path in the main scanning direction. For instance, the synchronization detection part 15 may be provided immediately before or after a scanning start position. The synchronization detection part 15 detects a laser beam transmitted through the fθ lens 12. When the synchronization detection part 15 detects the laser beam, the synchronization detection part 15 generates the synchronization detection signal detp (for aligning writing start positions at the same position in the main scanning direction) defining a writing start position in the main scanning direction at which the laser beam starts writing. Then, the synchronization detection part 15 outputs the generated synchronization detection signal detp to the data controller 20.

The position detection sensors 17 are disposed opposite the scanning surface of the photosensitive body 11, being equally spaced parallel to the main scanning direction. Each position detection sensor 17 reads the position of an image pattern for detection formed on the photosensitive body 11.

The data controller 20 outputs an image signal for controlling the laser light source driver 14 so as to control a laser beam writing operation by the optical scanner 10. The data controller 20 includes the pulse train generator part 21 as a phase control part, the clock generator part 22 as a pixel clock generation part, the image data processor part 23, the register 24, and the region generator part 25.

The clock generator part 22 establishes synchronization with the synchronization detection signal detp input from the synchronization detection part 15, and generates a pixel clock signal clkw, using a reference clock signal (an original clock signal) clko m times the frequency of the pixel clock signal clkw and toggling the signal level between HIGH (H) and LOW (L) every m clock pulses of clko by count control. The reference clock signal clko is generated from an oscillator (not graphically represented) provided in the clock generator part 22. The clock generator part 22 outputs the generated pixel clock signal clkw to the region generator part 25 and the image data processor part 23. As a result, the scanning start positions of main scanning lines on the photosensitive body 11 can be aligned.

When the clock generator part 22 detects the inputting of the synchronization detection signal detp from the synchronization detection part 15, the clock generator part 22 outputs a clear signal xlclr to the region generator part 25.

When the number of clock pulses of the input pixel clock signal clkw reaches predetermined values after the clear signal xlclr is input from the clock generator part 22, the region generator part 25 outputs area signals area(1), area (2), . . . , area(n−1), and area(n) to the pulse train generator part 21.

When each of the area signals area(1) through area(n) is input to the pulse train generator part 21 from the region generator part 25, the pulse train generator part 21 generates an external pulse train (hereinafter also referred to simply as pulses) xplsp (for phase delaying control) or xplsm (for phase advancing control) that is a control signal for performing phase changing with desired timing on the pixel clock signal clkw generated by the clock generator part 22. Then, the pulse train generator part 21 outputs the generated external pulse train xplsp or xplsm to the clock generator part 22.

The image data processor part 23 performs image processing on image data input from the printer controller 40 using a variety of information items used for image forming input from the register 24, such as information on dot processing and information specifying an image area based on printing paper size.

The image data processor part 23 also outputs an image signal input from the printer controller 40 to the laser light source driver 14 in synchronization with the pixel clock signal clkw.

The operation part 50 as an input part, through which information is input, may be, for instance, a touch panel or a group of key switches such as a keyboard. Set values prd(1) through prd(n) and num(1) through num(n) are input from the operation part 50.

The CPU 30, which is a microcomputer including a central processing unit and a program ROM, controls the engine unit (main body) of the image-forming apparatus including the optical scanner 10 and the data controller 20.

The CPU 30 functions as a scanning time comparison part and a set value calculation part.

The CPU 30 outputs the information input from the operation part 50 to the register 24 so that the information is set in the register 24. Specifically, an operator of the image-forming apparatus inputs the pulse generation intervals (periods) prd(1) through prd(n) and the numbers of pulses to be generated num(1) through num(n) of the external pulse trains xpls (xplsp or xplsm) using entry keys on the operation part 50. The CPU 30 sets the input set values prd(1) through prd(n) and num(1) through num(n) in the register 24.

The CPU 30 outputs phase delay control signals phsp(1) through phsp(n) for delaying the phase of the pixel clock signal clkw and phase advance control signals phsm(1) through phsm(n) for advancing the phase of the pixel clock signal clkw to the register 24 so that the external pulse trains xpls are output from the pulse train generator part 21.

The register 24, which is a storage medium temporarily storing the set values prd(1) through prd(n) and num(1) through num(n) set by the CPU 30, outputs the set values prd(1) through prd(n) and num(1) through num(n) to the pulse train generator part 21.

The register 24 also outputs the delay control signals phsp(1) through phsp(n) and the phase advance control signals phsm(1) through phsm(n) input by the CPU 30 to the pulse train generator part 21.

The register 24 also outputs a variety of information items used for image forming input by the CPU 30, such as information on dot processing and information specifying an image area based on printing paper size, to the image data processor part 23.

The printer controller 40 outputs image data in units of pages line by line (scan by scan) as an image signal (a video signal) to the image data processor part 23.

Figure 25:
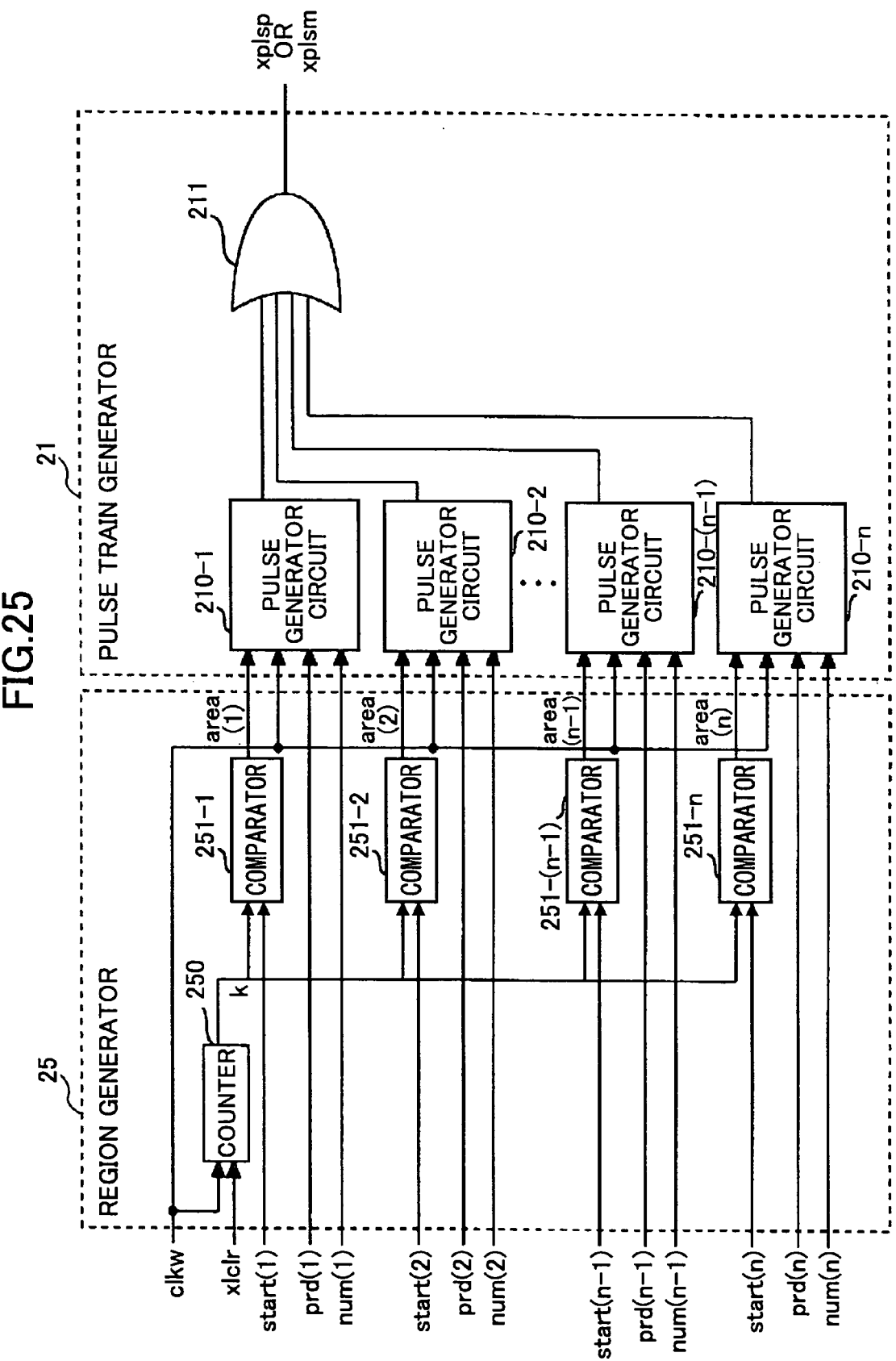
FIG. 25 is a block diagram showing more detailed configurations of the pulse train generator part and the region generator part according to the third embodiment of the present invention.

Next, a more detailed description is given, with reference to FIG. 25, of the configurations and operations of the pulse train generator part 21 and the region generator part 25 according to the third embodiment. FIG. 25 is a block diagram showing more detailed configurations of the pulse train generator part 21 and the region generator part 25 according to the third embodiment.

Referring to FIG. 25, the region generator part 25 includes the counter 250 and the n comparators 251-1 through 251-n.

The clear signal xlclr generated from the synchronization detection signal detp by the clock generator part 22 is input to the counter 250. Then, the counter 250 counts the number of pulses of the pixel clock signal clkw using the point of the inputting of the clear signal xlclr as a reference point, and outputs a count value k. The count value k is used for dividing the period of a single scan by the polygon mirror into multiple periods and setting each of the multiple periods as a divided period.

The first through $n^{th}$ start point values of the first through $n^{th}$ divided periods are preset in the comparators 251-1 through 251-n, respectively. Each of the comparators 251-1 through 251-n compares its corresponding start point value with the count value k of the counter 250. When the count value k reaches the corresponding start point value, each of the comparators 251-1 through 251-n outputs a corresponding one of the first through $n^{th}$ area signals area(1) through area(n). The first through $n^{th}$ start point values of the first through $n^{th}$ divided periods are set by first through $n^{th}$ start signals start(1) through start(n) input to the comparators 251-1 through 251-n, respectively, from the CPU 30.

For instance, the comparator 251-1 compares the count value k of the counter 250 and the first start point value of the first divided period indicated by the first start signal start(1). When the count value k reaches the first start point value (start(1)), the comparator 251-1 outputs the first area signal area(1).

The pulse train generator part 21 starts to count the number of pulses of the pixel clock signal clkw in response to the inputting of the clear signal xlclr to the pulse train generator part 21. When the count value reaches the (preset) set value prd (indicating intervals at which the external pulses xpls are generated), the pulse train generator part 21 outputs the external pulse train xpls to the clock generator part 22. Thus, the pulse train generator part 21 can change the phase of the pixel clock signal clkw when the pulse train generator part 21 outputs the external pulse trains xpls. When the number of pulses of the output external pulse train xpls reaches the set value num (indicating the number of external train pulses [xpls] and represented by a positive integer), the pulse train generator part 21 stops generating the external pulse train xpls.

The pulse train generator part 21 includes n pulse generator circuits 210-1 through 210-n and an OR circuit 211.

Figure 26:
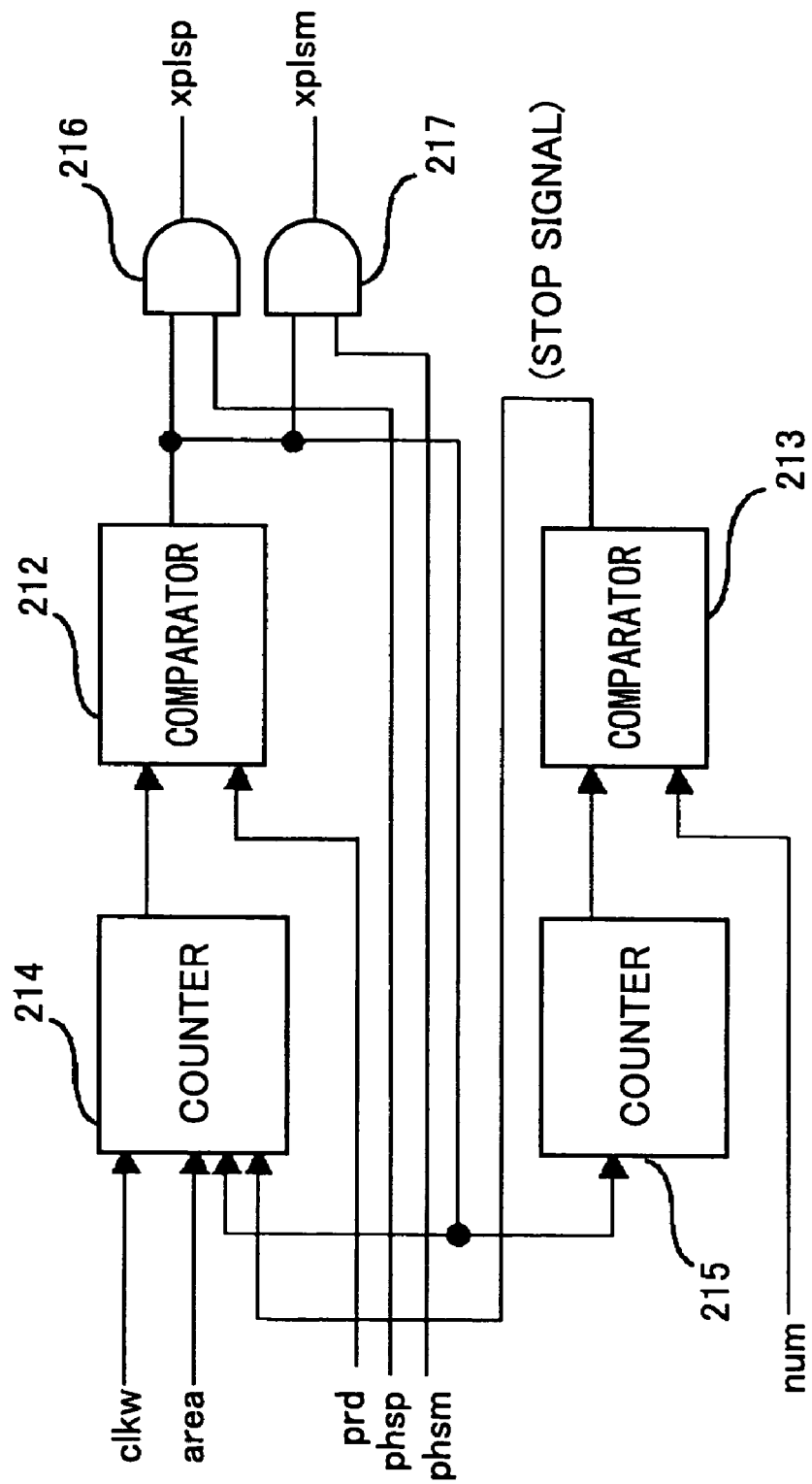
FIG. 26 is a block diagram showing a configuration of each of pulse generator circuits according to the third embodiment of the present invention.

Next, a description is given, with reference to FIG. 26, of the operation of generating external pulse trains by the pulse generator circuits 210-1 through 210-n. FIG. 26 is a block diagram showing a configuration of each of the pulse generator circuits 210-1 through 210-n according to the third embodiment.

Referring to FIG. 26, each of the pulse generator circuits 210-1 through 210-n includes the comparators 212 and 213, the counters 214 and 215, and the AND circuits 216 and 217.

In each of the pulse generator circuits 210-1 through 210-n a corresponding one of the pulse generation intervals (periods) prd(1) through prd(n) is set in the comparator 212 and a corresponding one of the numbers of pulses num(1) through num(n) is set in the comparator 213 by an engine CPU (not graphically represented). As a result, each of the pulse generator circuits 210-1 through 210-n performs the following operation when the polygon mirror 13 causes a laser beam to perform a scan in the main scanning direction.

When a corresponding one of the area signals area(1) through area(n) is input to the counter 214, the counter 214 starts a counting operation to count the number of pulses of the pixel clock signal clkw (a count value i) using the point of the inputting of the area signal as a reference point. The counter 214 stops the counting operation when a stop signal is input thereto from the comparator 213.

The comparator 212 compares the count value i of the counter 214 and the pulse generation interval (set value) prd (the corresponding one of the pulse generation intervals prd(1) through prd(n)) preset therein, and outputs a pulse (xpls) to the AND circuits 216 and 217 every time the count value i reaches the set value prd.

When the pulse xpls and a corresponding one of the phase delay control signals phsp(1) through phsp(n) are input to the AND circuit 216, the AND circuit 216 outputs a pulse xplsp. When the pulse xpls and a corresponding one of the phase advance control signals phsm(1) through phsm(n) are input to the AND circuit 217, the AND circuit 217 outputs a pulse xplsm.

The counter 215 counts the number of pulses xpls output from the comparator 212 (a count value j).

The comparator 213 compares the count value j of the counter 215 and the number of pulses (set value) num (the corresponding one of the numbers of pulses num(1) through num(n)) preset therein. When the count value j reaches the set value num, the comparator 213 outputs the stop signal.

As described above, the pulse generation intervals (set values) prd(1) through prd(n), which may be any values, and the numbers of pulses (set values) num(1) through num(n), which may also be any values, are set in the corresponding pulse generator circuits 210-1 through 210-n.

When the external pulse train xpls (xplsp or xplsm) is input from any of the pulse generator circuits 210-1 through 210-n to the OR circuit 211, the OR circuit 211 directly outputs the input external pulse train xpls.

Figure 27:
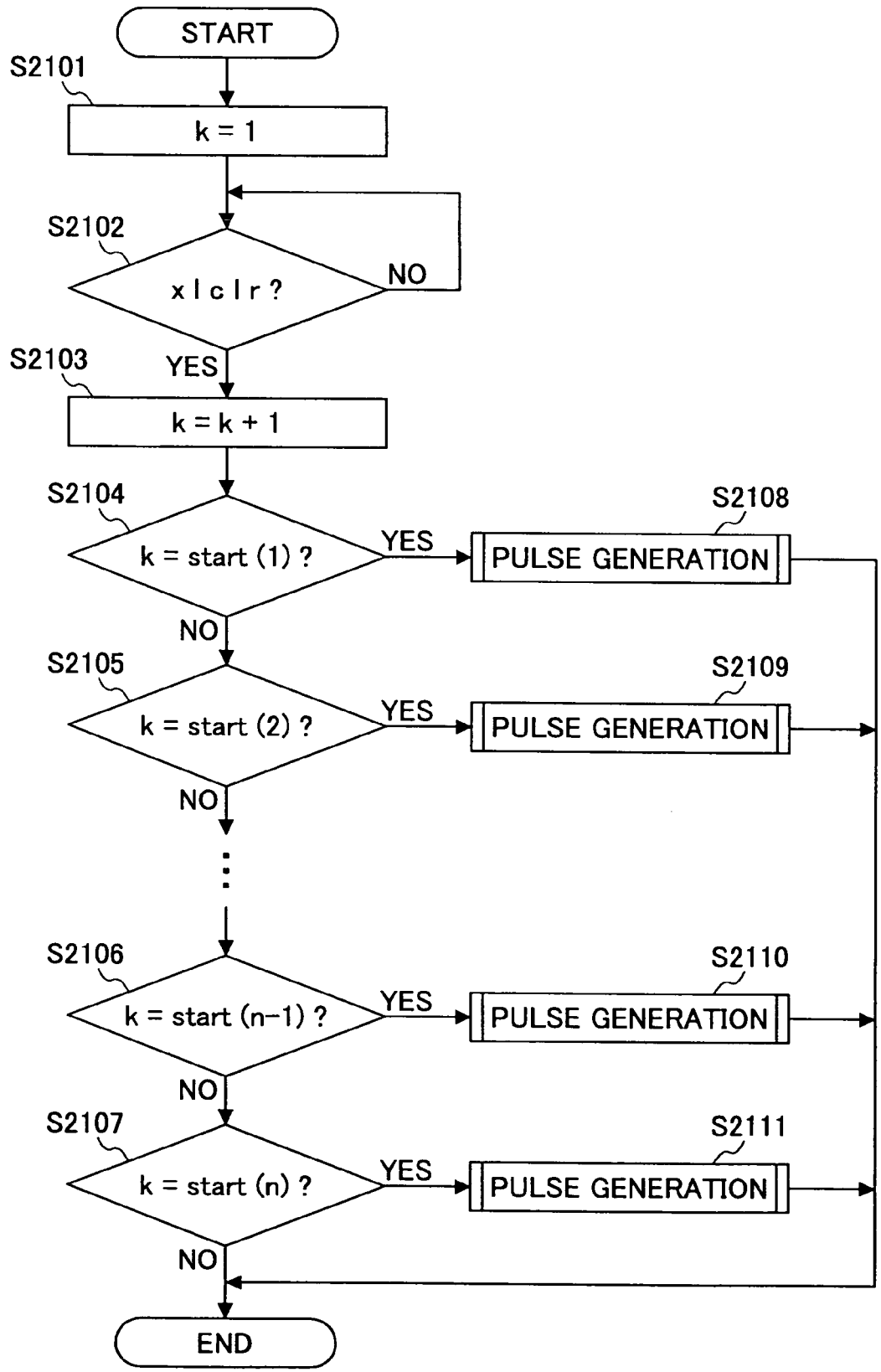
FIG. 27 is a flowchart of the operation of generating pulses by the pulse train generator part according to the third embodiment of the present invention.

Next, a detailed description is given, with reference to FIG. 27, of the operation of the pulse train generator part 21. FIG. 27 is a flowchart of the operation of generating pulses by the pulse train generator part 21 according to the third embodiment.

First, in step S2101, when power is turned on, the counter 250 of the region generator part 25 resets the count value k to "1."

Thereafter, in step S2102, it is determined whether the clear signal xlclr has been input to the counter 250. If the clear signal xlclr has been input to the counter 250 (that is, "YES" in step S2102), in step S2103, the counter 250 increments the count value k by one every time a pulse of the pixel clock signal clkw is input thereto. Next, when the count value k reaches the start point values of the divided periods (start(1) through start(n)) in steps S2104 through S2107, in steps S2108 through S2111, the corresponding comparators 251-1 through 251-n output the corresponding first through $n^{th}$ area signals area(1) through area(n). When the first through $n^{th}$ area signals area(1) through area(n) are input to the corresponding pulse generator circuits 210-1 through 210-n of the pulse train generator part 21, each of the pulse generator circuits 210-1 through 210-n performs a pulse generation operation.

In this case, first, the count value k of the counter 250 reaches the start point value start(1) of the first divided period, when the comparator 251-1 outputs the area signal area(1) to the pulse generator circuit 210-1. Then, the pulse generator circuit 210-1 performs the same operation as the above-described pulse generation operation using its internal components including the counters 214 and 215 (FIG. 26). As a result, the pulse generator circuit 210-1 generates the external pulse train xpls corresponding to the first divided period, and outputs the generated external pulse train xpls to the OR circuit 211. This external pulse train xpls is output via the OR circuit 211.

Next, the count value k of the counter 250 reaches the start point value start(2) of the second divided period, when the comparator 251-2 outputs the area signal area(2) to the pulse generator circuit 210-2. Then, the pulse generator circuit 210-2 performs the same operation as the above-described pulse generation operation using its internal components including the counters 214 and 215. As a result, the pulse generator circuit 210-2 generates the external pulse train xpls corresponding to the second divided period, and outputs the generated external pulse train xpls to the OR circuit 211. This external pulse train xpls is also output via the OR circuit 211.

Thereafter, the same process as described above is repeated until the external pulse train xpls corresponding to the $n^{th}$ (final) divided period is generated from the pulse generator circuit 210-n to be output via the OR circuit 211. Thus, finally, an external pulse train (final external pulse train) XPLS is output from the OR circuit 211.

Figure 28:
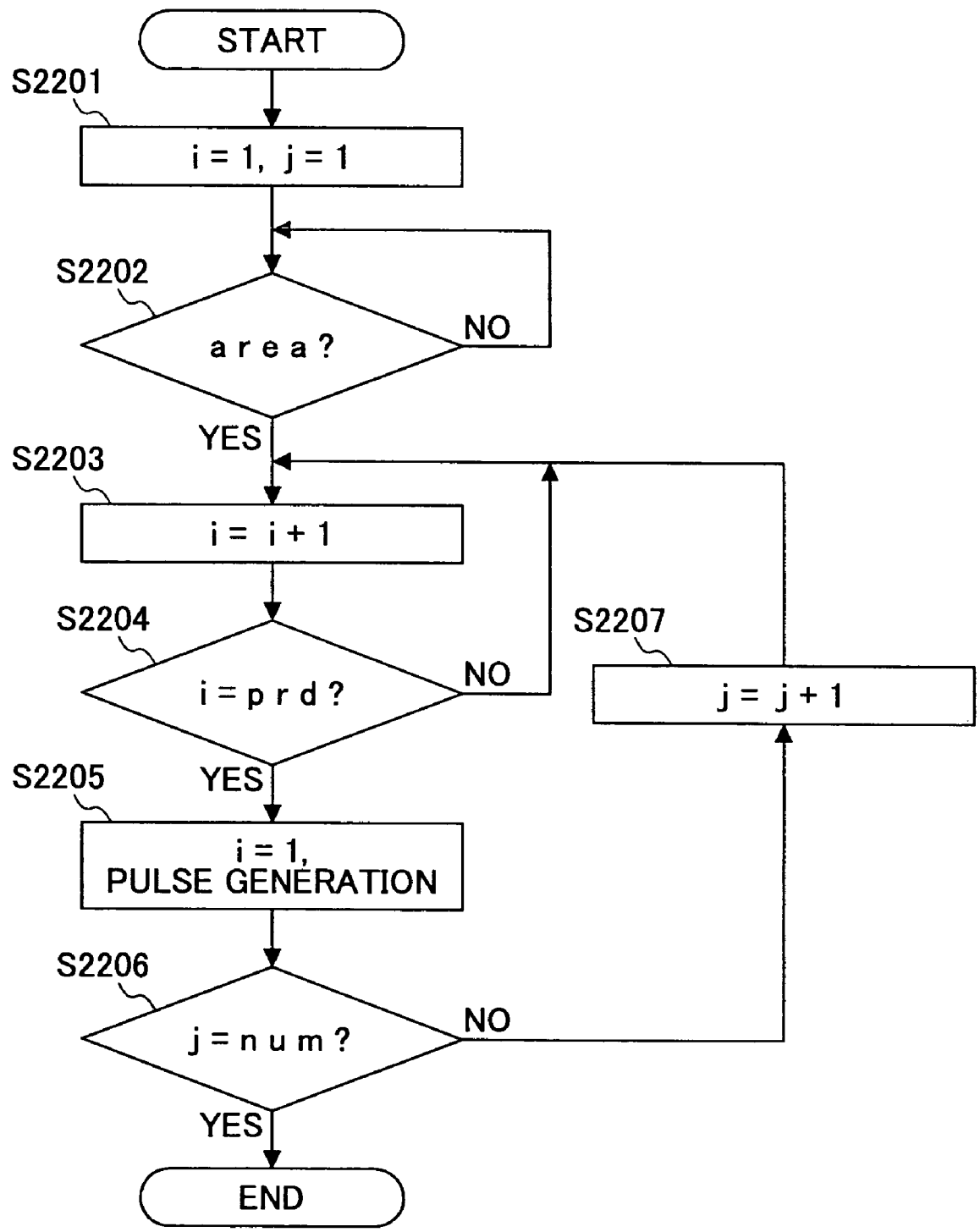
FIG. 28 is a flowchart of a pulse generation operation by each of the pulse generator circuits according to the third embodiment of the present invention.

Next, a description is given, with reference to FIG. 28, of the pulse generation operation by each of the pulse generator circuits 210-1 through 210-n according to the third embodiment. FIG. 28 is a flowchart of the pulse generation operation by each of the pulse generator circuits 210-1 through 210-n according to the third embodiment. The flowchart of FIG. 28 shows the operation of each of steps S2108 through S2111 of FIG. 27 in detail.

In step S2201, when the pulse generator circuit 210 (indicating any of 210-1 through 210-n) is turned on, the counters 214 and 215 reset their respective count values i and j each to "1."

Thereafter, in step S2202, it is determined whether a corresponding one of the area signals area(1) through area(n) has been input to the counter 214. If "NO" in step S2202, the counter 214 waits until the corresponding area signal is input thereto. If it is determined the corresponding area signal has been input to the counter 214 (that is, "YES" in step S2202), in step S2203, the counter 214 increments the count value i by one every time a pulse of the pixel clock signal clkw is input thereto.

Then, in step S2204, the comparator 212 determines whether the count value i has reached a corresponding one of the set values prd(1) through prd(n). If "NO" in step S2204, the counter 214 increments the count value i by one. The counter 214 repeats the operation of step S2203 until the count value i reaches the corresponding set value prd in step S2204.

If the comparator 212 determines that the count value i has reached the corresponding set value prd (that is, "YES" in step S2204), in step S2205, the comparator 212 outputs a pulse xpls. The output pulse xpls is input to the counter 214 so that the count value i is reset to "1."

In step S2206, the comparator 213 compares the count value j of the counter 215 and a corresponding one of the numbers of pulses num(1) through num(n), and determines whether the count value j has reached the corresponding set value num. If the count value j has not reached the corresponding set value num (that is, "NO" in step S2206), in step S2207, the counter 215 increments the count value j by one every time the pulse xpls is input thereto.

Thereafter, when the counters 214 and 215 repeat the above-described operations so that the count value j reaches the corresponding set value num (that is, "YES" in step S2206), the comparator 213 generates and outputs a stop signal to the counter 214. As a result, the pulse generator circuit 210 stops the pulse generation operation.

Figure 29:
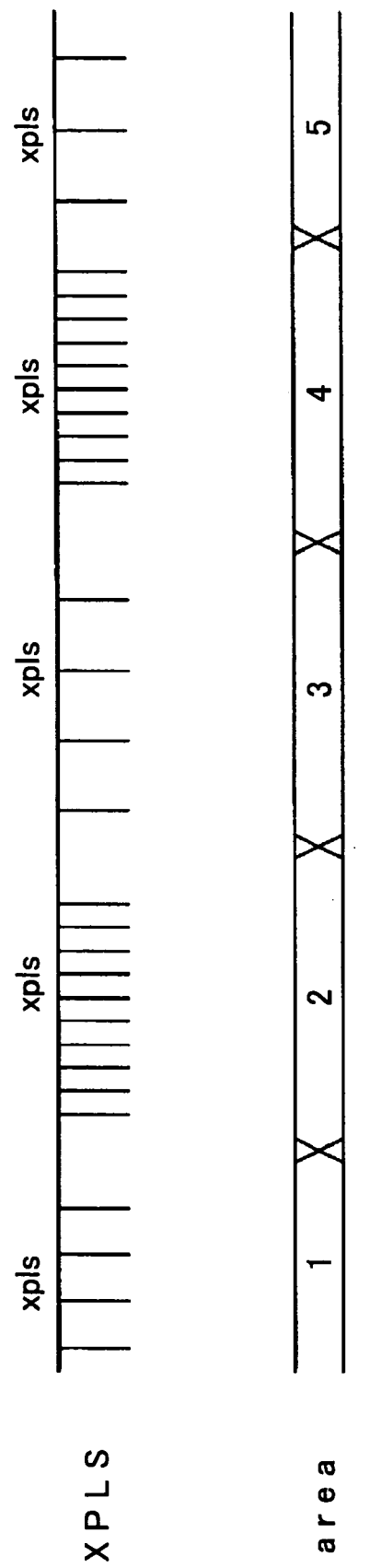
FIG. 29 is a diagram showing the external pulse train output from the pulse train generator part according to the third embodiment of the present invention.

As shown in FIG. 29, the external pulse train XPLS finally output from the pulse train generator part 21 includes the external pulse train xpls of each divided period (area) composed of any number of pulses.

According to this embodiment, the pulse train generator part 21 can generate any pulse train at any position in each area depending on settings (the set values prd and num). That is, a pulse train may be generated individually in each of multiple regions (areas), so that a partial magnification error in the main scanning direction can be corrected in each region (area).

The CPU 30 sets the start point values start(1) through start(n) in the register 24 so that an area larger in width in the main scanning direction is assigned to an image region having a greater deviation of writing magnification. That is, by setting a greater interval between a start point value for defining the start point of a first area and a start point value for defining the start point of a second area next to the first area, the first area can be set to be larger in width in the main scanning direction.

A large number of pulses xpls can be generated for an area having a large width. Accordingly, the range of correction of writing magnification can be widened. Meanwhile, a small number of pulses xpls is sufficient for an image region having a narrow range of correction of writing magnification. Accordingly, an area small in width may be assigned to such an image region.

For instance, an upper limit may be set to the number of pulses xpls assigned to a single area. In this case, the upper limit value may be preset in the register 24, and the CPU 30 may set the width of each area in the main scanning direction so that the number of pulses xpls assigned to each area does not exceed the upper limit value.

Figure 30:
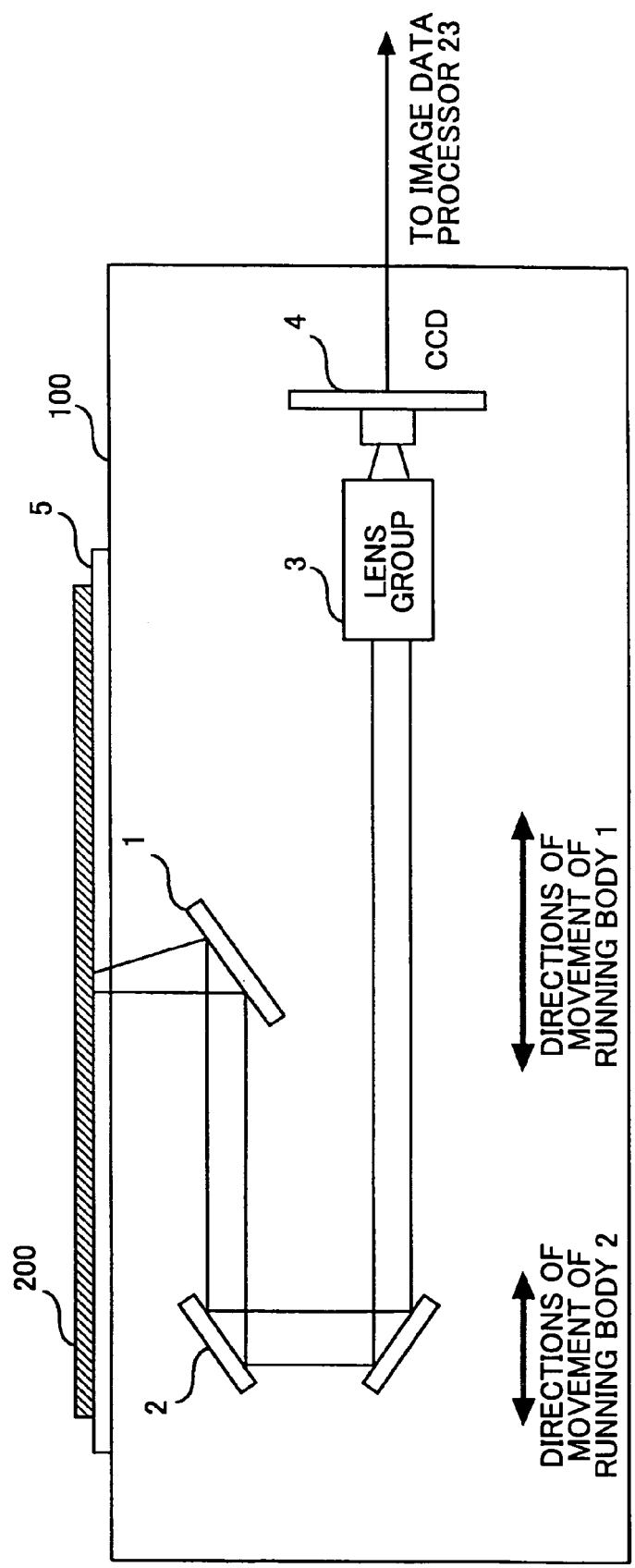
FIG. 30 is a schematic diagram showing a reader unit according to the third embodiment of the present invention.

FIG. 30 is a diagram showing the reader unit 100 (of a flat-bed type) according to the third embodiment. The reader unit 100 includes running bodies (carriages) 1 and 2, a lens group 3, a CCD 4, and an original placement table (glass) 5.

An original (an object of reading) 200 is placed on the original placement table 5 that transmits light, and an image on the surface of the original 200 which surface is in contact with the original placement table 5 is read while moving the running bodies 1 and 2 along the sub scanning direction.

Referring to FIG. 30, the light source of the reading unit 100 emits light onto the surface of the original 200 which surface is in contact with the original placement table 5. The reflected light from the surface of the original 200 is further reflected by the running bodies 1 and 2 to enter the CCD 4 (an image capturing device) arranged along the main scanning direction via the lens group 3.

According to this embodiment, the running bodies 1 and 2 are driven along the sub scanning direction to read the image of the original 200. Alternatively, a sheet through-type reader unit that moves the original 200 itself with the running bodies 1 and 2 being fixed is also applicable to this embodiment.

The CCD 4 converts the received reflected light from the original 200 into an analog electrical signal. Thereafter, the CCD 4 converts the analog electrical signal into a digital signal, and extracts the digital signal as digital data.

Figure 31:
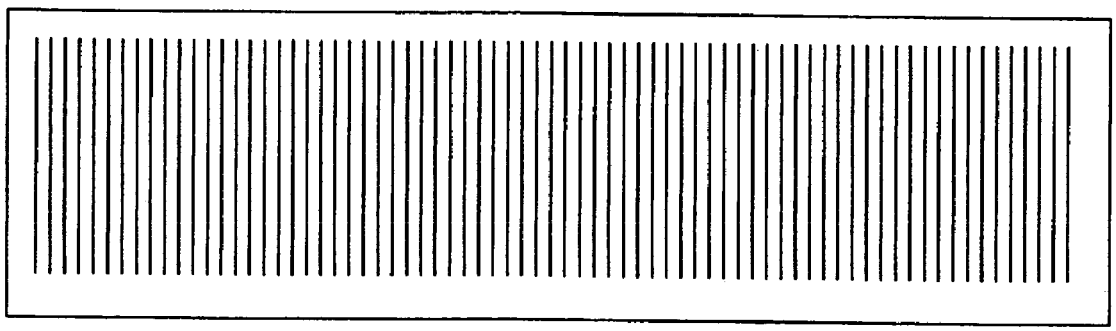
FIG. 31 is a diagram showing an image pattern formed on the reading-side surface of an original according to the third embodiment of the present invention.

FIG. 31 is a diagram showing an image pattern formed on the reading-side surface (contacting the original placement table 5) of the original 200 according to the third embodiment.

As shown in FIG. 31, the image pattern of multiple vertical lines equal in width and spaced equally is formed (printed) on the reading-side surface of the original 200.

The reader unit 100 read the image pattern on the original 200.

The CCD 4 reads an image in units of pixels. Accordingly, the CCD 4 recognizes the output of the image pattern not as density but as vertical lines, that is, black and white lines.

The image data read by the CCD 4 is input to the image data processor part 23.

The image data processor part 23 performs averaging processing on the input data. This output information resulting from the averaging processing is a density level.

Here, a description is given of the averaging processing.

First, in the case of dividing an output image in multiple regions in the main scanning direction, the reader unit 100 reads an image in each region, and outputs the read image to the image data processor part 23.

Next, the image data processor part 23 detects the number of pixels of the image in the region (, which is the number of white pixels in the case of a monochrome image).

Next, the image data processor part 23 performs averaging by dividing the detected number of pixels of the image by the number of pixels of the CCD 4 in the main scanning direction of the entire region, and outputs a density level to the CPU 30.

Accordingly, in the case of a monochrome image, the density is highest when the entire image is white and is lowest when the entire image is black.

Thereby, the averaging processing ends.

Thereafter, as in the normal printing operation, the read image is formed as an electrostatic latent image on the photosensitive body 11. Thereafter, being transferred and conveyed, the image is output, printed on a paper medium.

This image data, printed out by the printing part (not graphically represented) of the image-forming apparatus after once being read, is considered to be output image data.

Figure 32:
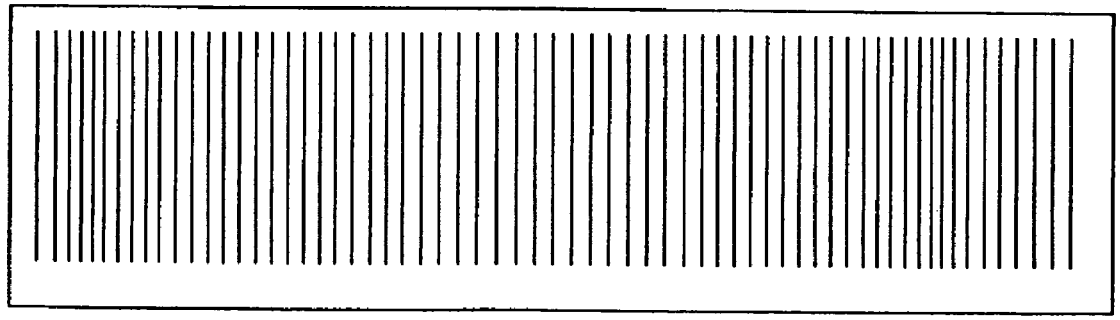
FIG. 32 is a diagram showing output image data having variations in writing magnification on a single scanning line according to the third embodiment of the present invention.

FIG. 32 is a diagram showing output image data having variations in writing magnification (or, in the intervals between dot positions) on a single scanning line.

When the image data shown in FIG. 31 is read and printed out with variations in the intervals between writing positions, the variations appear as variations in the distances between lines on the output image pattern as shown in FIG. 25.

Figure 33:
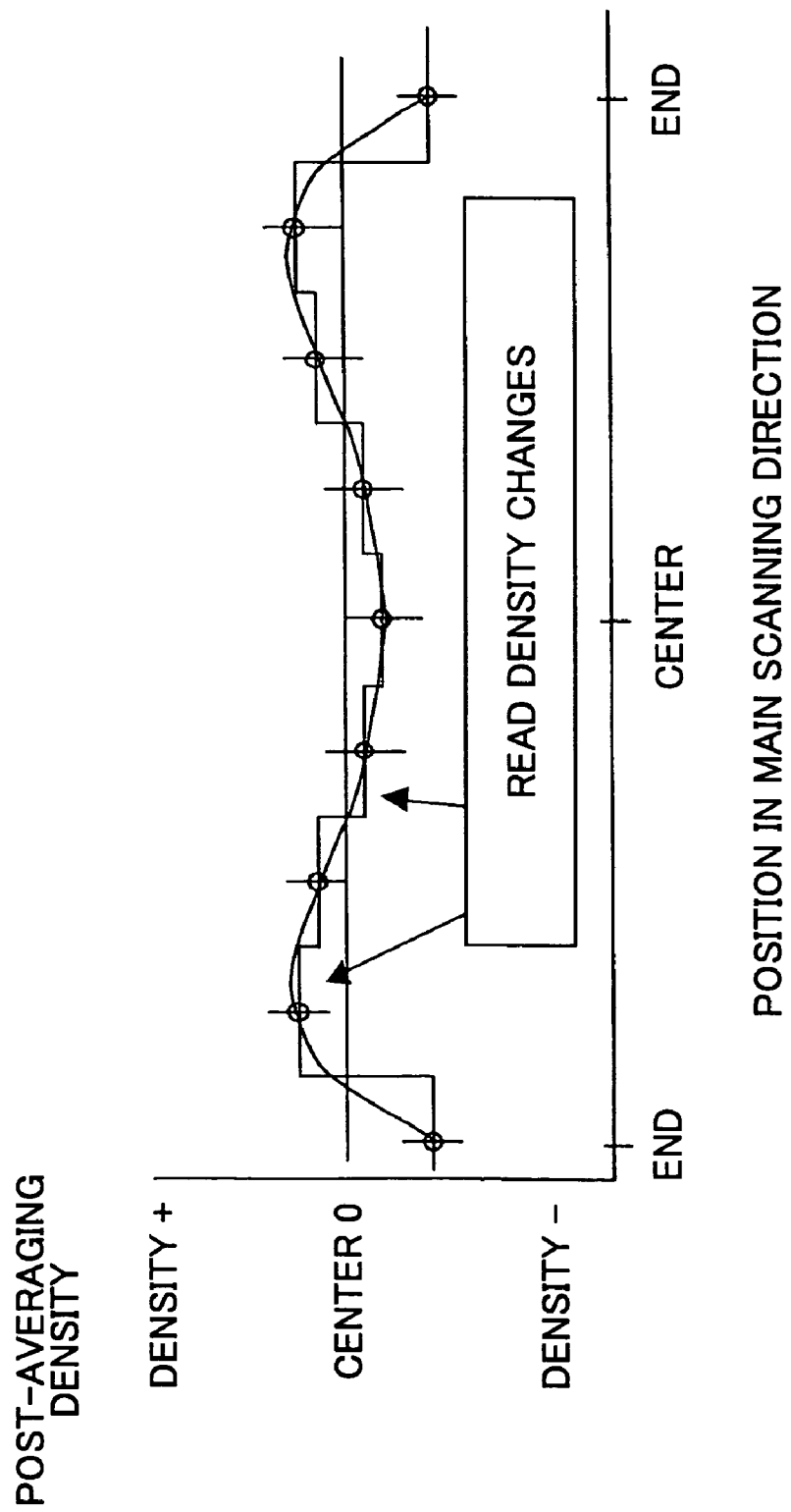
FIG. 33 is a graph showing the relationship between read density values after averaging processing and positions in the main scanning direction according to the third embodiment of the present invention.

FIG. 33 is a graph showing the relationship between read density values after the averaging processing and positions in the main scanning direction.

As shown in FIG. 33, if the averaging processing is performed in a section assumed in each region with the occurrence of magnification deviation error, variations in the intervals between dot positions in each region appear as density through the image.

The CPU 30 corrects writing magnification (the dot positions of the image) based on each density level input from the image data processor part 23.

In a high-density region (where dot positions are closely spaced) in the main scanning direction, the CPU 30 performs control so as to delay the phase of the pixel clock signal clkw, that is, so as to reduce the frequency of the pixel clock signal clkw to form an image on the photosensitive body 11. As a result, the distance between dots can be widened in the high-density region in the main scanning direction.

On the other hand, in a low-density region (where dot positions are widely spaced) in the main scanning direction, the CPU 30 performs control so as to advance the phase of the pixel clock signal clkw, that is, so as to increase the frequency of the pixel clock signal clkw to form an image on the photosensitive body 11. As a result, the distance between dots can be narrowed in the low-density region in the main scanning direction.

As described above, the width of each of divided regions (areas) in the main scanning direction is set based on the number of control pulses xpls necessary for this phase change.

Figure 34:
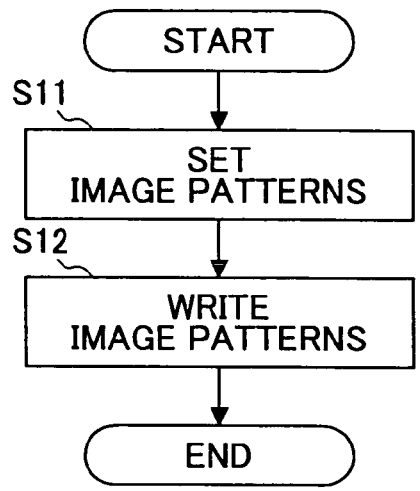
FIG. 34 is a flowchart showing the operation of writing an image pattern by the image-forming apparatus according to the third embodiment of the present invention.
Figure 35:
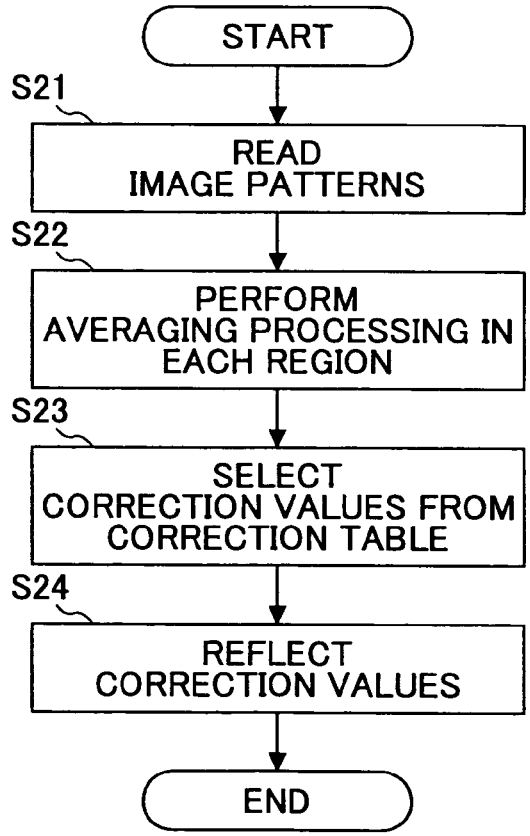
FIG. 35 is a flowchart showing the operation of correcting writing magnification by the image-forming apparatus according to the third embodiment of the present invention.

FIG. 34 is a flowchart showing the operation of writing an image pattern by the image-forming apparatus according to the third embodiment of the present invention. FIG. 35 is a flowchart showing the operation of correcting writing magnification by the image-forming apparatus according to the third embodiment of the present invention.

FIGS. 34 and 35 show the case where the operation of reading an image pattern by the reader unit 100 and the operation of writing an image pattern by the printing part are performable independent of each other.

A description is given below, with reference to FIG. 34, of the operation of writing an image pattern by the image-forming apparatus, which is on the image pattern writing side according to this embodiment.

First, in step S11 of FIG. 34, when the mode of outputting a specific image pattern is entered as a result of, for instance, an input from the operation part 50, the setting of image pattern writing control is performed.

Next, in step S12, the image-forming apparatus prints the image pattern on a recording medium (print paper). Thereby, the image pattern writing operation ends.

Next, a description is given, with reference to FIG. 35, of the correction of writing magnification according to this embodiment.

First, the original 200 on which an image pattern is printed is placed and set on the original placement table 5 of the reader unit 100.

Next, as described above, in step S21 of FIG. 35, the reader unit 100 reads the image pattern on the original 200.

Next, in step S22, the image data processor part 23 performs the averaging processing. Density levels output from the image data processor part 23 are input to the CPU 30.

Next, in step S23, the CPU 30 determines the density of each divided region in the main scanning direction based on the density level of an image in each divided region, and selects a correction (value) for each divided region from a correction table. Then, in step S24, the CPU 30 corrects writing magnification in each divided region using the corresponding selected correction.

The correction table, in which a correction is measured and determined in advance for each density level, may be stored in, for instance, the register 24. The CPU 30, referring to the correction table, extracts a correction corresponding to the density level of each divided region, and controls the output of the pulses xpls based on the corrections so as to adjust the phase of the pixel clock signal clkw. The selected (extracted) corrections are shown on a display on the operation part 50.

Figure 36:
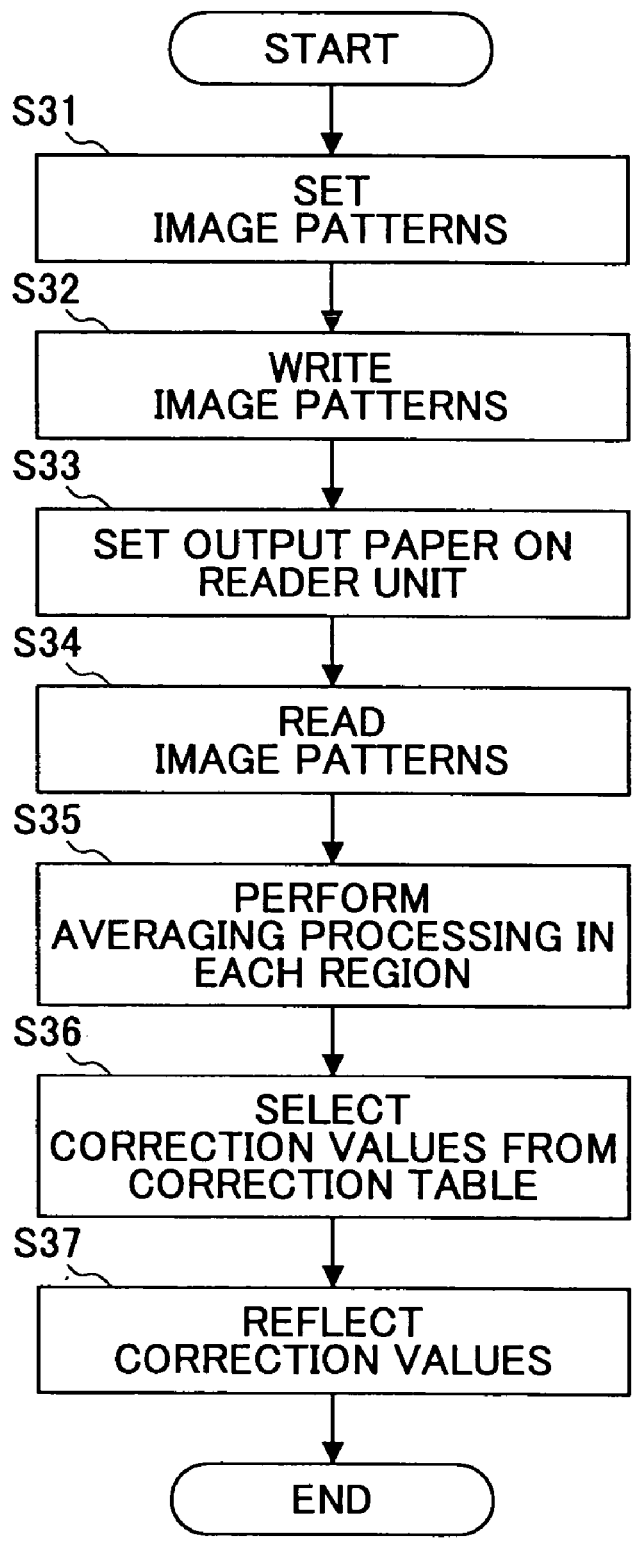
FIG. 36 is a flowchart showing a series of operations in the case of the image-forming apparatus automatically performing the operation of writing an image pattern through the operation of correcting image writing magnification according to the third embodiment of the present invention.

FIG. 36 is a flowchart showing a series of operations in the case of the image-forming apparatus automatically performing the operation of writing an image pattern through the operation of correcting image writing magnification according to the third embodiment of the present invention.

The operation shown in FIG. 36 is a combination of the operations of FIGS. 34 and 35.

A description is given below, with reference to FIG. 36, of the above-mentioned operation of the image-forming apparatus according to this embodiment.

First, in step S31 of FIG. 36, when the mode of outputting a specific image pattern is entered as a result of, for instance, an input from the operation part 50, the setting of image pattern writing control is performed.

Next, in step S32, the image-forming apparatus prints the image pattern on a recording medium (print paper). After the printing, a message prompting the setting of the recording medium (the original 200) on the reading unit 100 is shown on the display of the operation part 50.

Next, in step S33, the original 200 on which the image pattern is printed is placed and set on the original placement table 5 of the reader unit 100.

Next, in step S34, the reader unit 100 reads the image pattern on the original 200.

Next, in step S35, the image data processor part 23 performs the averaging processing. Density levels output from the image data processor part 23 are input to the CPU 30.

Next, in step S36, the CPU 30 determines the density of each divided region in the main scanning direction based on the density level of an image in each divided region, and selects a correction (value) for each divided region from the correction table. Then, in step S37, the CPU 30 corrects writing magnification in each divided region using the corresponding selected correction. Thereby, the operation ends.

According to this embodiment, the reader unit 100 is provided in the image-forming apparatus. Alternatively, an image reader (scanner) having the same configuration and function as the reader unit 100 may be provided external to the image-forming apparatus to be connected to the image-forming apparatus via a network. In this case, image data read by the image reader is input to the image data processor part 23 of the image-forming apparatus, and thereafter, is printed and output in the same manner.

As described above, according to this embodiment, in the case of setting a wide correction range of writing magnification for a region (an area), a large width is assigned to the region (area), and in the case of setting a narrow correction range of writing magnification for a region (an area), a small width is assigned to the region (area). Further, according to this embodiment, the image pattern of multiple line segments equally spaced in the main scanning direction is read so that the density distribution of an output image in the main scanning direction is detected. The correction of image writing magnification is performed so as to make the density distribution uniform.

Accordingly, it is possible to realize an optical system in which distortion in the main scanning direction after fθ correction is controlled and that has an optimum characteristic adapted to each optical unit.

Further, it is possible to correct image writing magnification easily in the image-forming apparatus and apply an optimum optical system thereto not only in a factory at the time of its shipment but also in the marketplace.

[Fourth Embodiment]

Next, a description is given of a fourth embodiment of the present invention. The fourth embodiment is equal in configuration and operation to the third embodiment unless otherwise specified.

Figure 37:
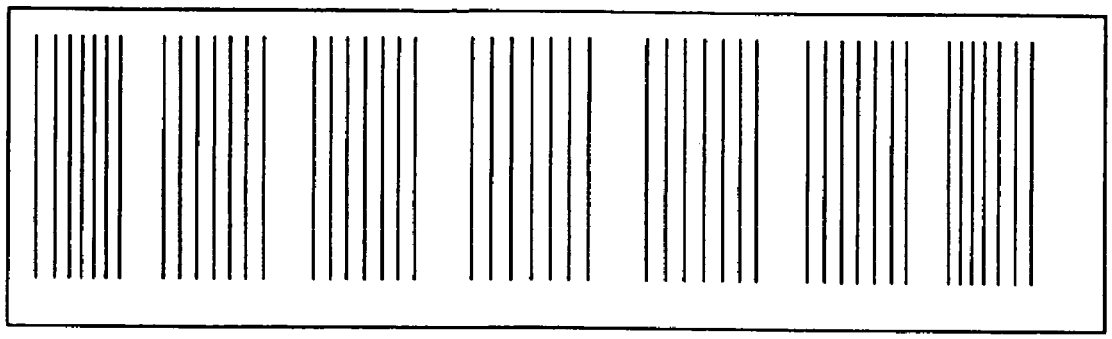
FIG. 37 is a diagram showing an image pattern formed on the reading-side surface of the original according to a fourth embodiment of the present invention.

FIG. 37 is a diagram showing an image pattern formed on the reading-side surface (contacting the original placement table 5) of the original 200 according to the fourth embodiment of the present invention.

According to this embodiment, the image pattern is divided into portions corresponding to divided regions. As a result, it is possible to improve the accuracy of writing magnification correction without detecting pattern changes (or error in the number of lines) in the vicinity of the boundaries between divided regions due to reading position error or extreme magnification error.

The image pattern according to this embodiment may be multiple images of the same pattern printed side by side in the main scanning direction at predetermined intervals.

In the case of FIG. 37, a number of lines sufficient for performing averaging in each divided region may be formed on the image pattern, and there is no need to obtain the width of each divided region.

[Fifth Embodiment]

Figure 38A:
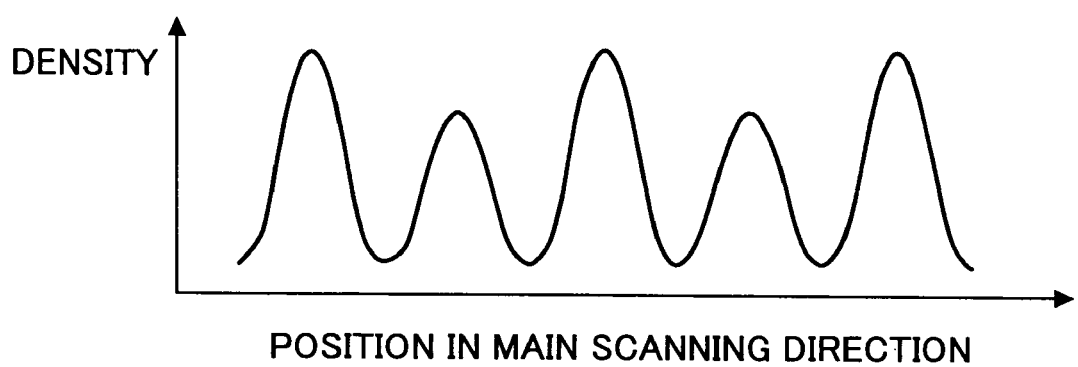
FIGS. 38A and 38B are graphs showing the density distributions of output images in the main scanning direction according to a fifth embodiment of the present invention.
Figure 38B:
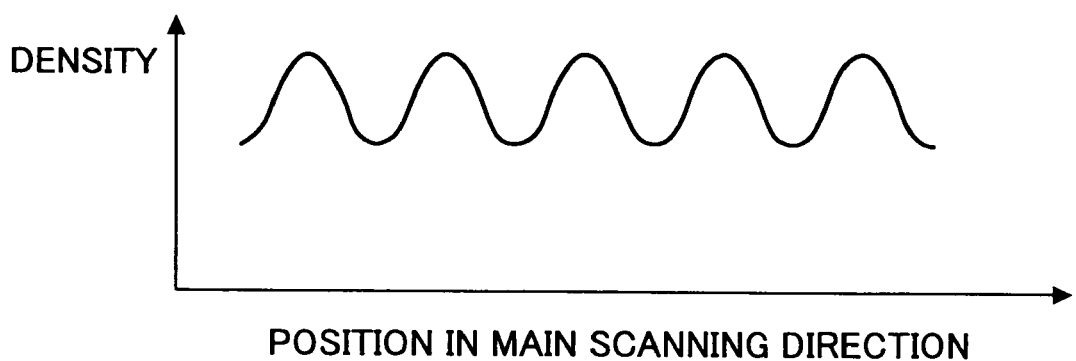
Figure 39:
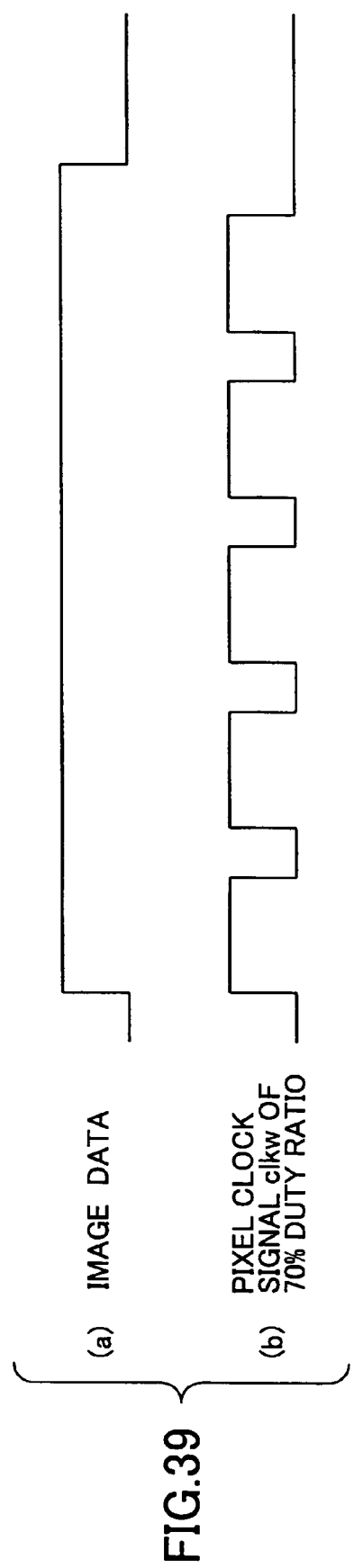
FIG. 39 is a timing chart showing image data and the pixel clock signal according to the fifth embodiment of the present invention.

Next, a description is given, with reference to FIGS. 38A, 38B, and 39, of a fifth embodiment of the present invention. The fifth embodiment is equal in configuration and operation to the third embodiment unless otherwise specified.

FIG. 38A is a graph showing the density distribution of an output image in the main scanning direction when the ratio of the width of a black line to the interval between black lines (or the ratio of black line width to white line width) on an image pattern is 1:1 according to the fifth embodiment. FIG. 38B is a graph showing the density distribution of an output image in the main scanning direction when the ratio of the width of a black line to the interval between black lines (or the ratio of black line width to white line width) on an image pattern is 0.7:0.3 according to the fifth embodiment.

FIG. 39 is a timing chart showing image data indicated by (a) and the pixel clock signal clkw indicated by (b) according to the fifth embodiment.

As shown in FIG. 38A, when each line of the image pattern approximates a pixel of the CCD 4 in size, black lines and white lines may each be detected over two pixels of the CCD 4 to interfere with each other. As a result, a correct value may not be read (or moiré may occur).

Therefore, the black line interval of the image pattern may be set to approximate a pixel of the CCD 4, leaving a region where the white lines are formed. This makes it possible to facilitate the averaging of image density.

If the dots of an image to be written are spaced at extremely narrow intervals, adjacent dots may overlap with each other to degrade image quality.

Accordingly, as shown in FIG. 39, the entire image pattern is made solid (black pixels) and the duty ratio of the pixel clock signal clkw is set to less than or equal to 70%. Thereby, the interval between adjacent dots is ensured approximately at this value in the case of an optical system that forms an image on a photosensitive body with beam spots. The density distribution of an output image in the main scanning direction in the case of setting the duty ratio of the pixel clock signal clkw to less than or equal to 70% is shown in FIG. 38B.

By thus making the entire image pattern black and setting the duty ratio of the pixel clock signal clkw to less than or equal to 70%, the output waveform of an image pattern that is close to black and to which variations of white are added can be obtained (FIG. 38B). This makes it easy to perform averaging irrespective of reading conditions on the reader unit 100 side.

[Sixth Embodiment]

Next, a description is given of a sixth embodiment of the present invention. The sixth embodiment is equal in configuration and operation to the third embodiment unless otherwise specified.

Figure 40:
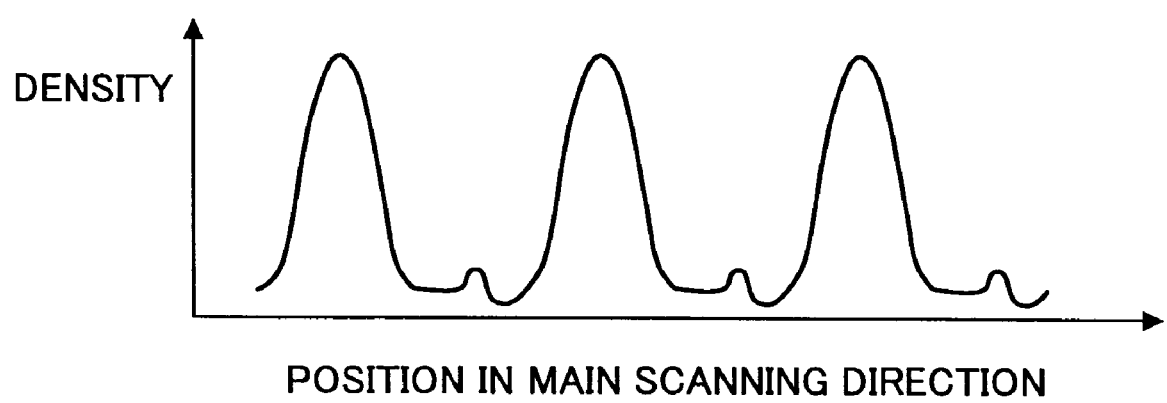
FIG. 40 is a graph showing the density distribution of an output image in the main scanning direction according to a sixth embodiment of the present invention.
Figure 41:
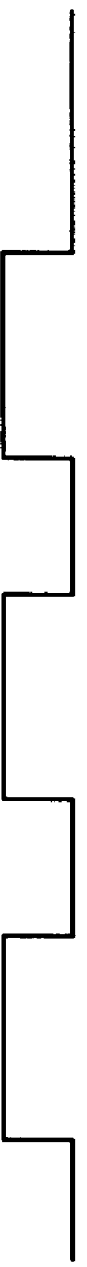
FIG. 41 is a timing chart showing the pixel clock signal according to the sixth embodiment of the present invention.

FIG. 40 is a graph showing the density distribution of an output image (an image pattern) in the main scanning direction according to the sixth embodiment (the case of a thinned-out pattern). FIG. 41 is a timing chart showing the pixel clock signal clkw according to the sixth embodiment.

According to this embodiment, as in the third embodiment, an image pattern of alternately repeated black and white lines is read to correct writing magnification.

According to this embodiment, as shown in FIGS. 40 and 41, black and white are separated by widely spacing or thinning out the black lines instead of using the line width and interval approximating a pixel of the CCD 4, thereby controlling interference or the occurrence of moire.

According to this embodiment, it is ensured that the interval between each two adjacent black lines, or the width of each white line, is greater than or equal to a predetermined value. At least, the interval between each two adjacent black lines is much greater than the width of each black line.

As a result, the outputs of the pixels of the CCD 4 are clearly distinguished from one another so as to make it easy to disassemble white pixel data and black pixel data, thus facilitating averaging. Further, this is also applicable to an image-forming system without halftone.

In each of the above-described embodiments, the above-described operations are performed by a computer program included in the image-forming apparatus. The program may be recorded on a recording medium such as an optical recording medium, a magnetic recording medium, a magneto-optical recording medium, or a semiconductor recording medium and loaded into the image-forming apparatus from the recording medium. Alternatively, the program may be loaded into the image-forming apparatus from an external apparatus connected thereto through a predetermined network.

The above-described embodiments are applicable to, for instance, a printer, a copier, and a facsimile machine that have an engine using an LD optical system.

According to the present invention, in each imaging optical system mounted in an image-forming apparatus, image writing magnification may be measured for each of divided regions in the main scanning direction and the image writing magnification may be corrected region by region. Accordingly, it is possible to eliminate the color misregistration and magnification deviations of an image in the main scanning direction. Further, according to the present invention, it is possible to realize an optical system in which distortion in the main scanning direction after fθ correction is controlled and that has an optimum characteristic adapted to each optical unit.

The present invention is not limited to the specifically disclosed embodiments, and variations and modifications may be made without departing from the scope of the present invention.

The present application is based on Japanese Priority Applications No. 2003-193239, filed on Jul. 7, 2003, No. 2003-323051, filed on Sep. 16, 2003, and No. 2004-017921, filed on Jan. 27, 2004, the entire contents of which are hereby incorporated by reference.

What is claimed is:

1. An image-forming apparatus, comprising:
at least one imaging optical system configured to form an electrostatic latent image on an evenly charged scanning surface of a medium to be scanned moving in a sub scanning direction by scanning the scanning surface in a main scanning direction perpendicular to the sub scanning direction by periodically deflecting a laser beam emitted from a laser light source with a rotary deflector;
a pixel clock generation part configured to generate a pixel clock signal for controlling timing of emission of the laser beam by the laser light source and change a phase of the pixel clock signal;
a region setting part configured to set length of each of a plurality of regions in the main scanning direction based on image writing magnifications in a line in the main scanning direction, the regions being formed by dividing part of the scanning surface corresponding to the line in the main scanning direction; and
a phase control part configured to control the changing of the phase of the pixel clock signal region by region based on the image writing magnifications,
wherein the formed image is transferred to a transfer medium and output.

2. The image-forming apparatus as claimed in claim 1, further comprising:
a phase change storage part configured to store an amount of the changing of the phase of the pixel clock signal for each region, the amount being based on a corresponding one of the image writing magnifications,
wherein the phase control part controls the changing of the phase of the pixel clock signal based on the amounts of the changing of the phase of the pixel clock signal stored by the phase change storage part.

3. The image-forming apparatus as claimed in claim 2, further comprising:
a detection pattern forming part configured to form a plurality of image patterns for position detection in the main scanning direction on the scanning surface;
a measurement part configured to measure formation positions of the image patterns; and
a writing magnification updating part configured to update the image writing magnifications in the main scanning direction based on the measured formation positions of the image patterns,
wherein the phase change storing part stores new amounts of the changing of the phase of the pixel clock signal based on the updated image writing magnifications, and the phase control part controls the changing of the phase of the pixel clock signal region by region based on the new amounts of the changing of the phase of the pixel clock signal.

4. The image-forming apparatus as claimed in claim 3, further comprising:
a position determination part configured to determine whether the measured formation position of each image pattern is located within a predetermined range,
wherein if the measured formation position of each image pattern is outside the predetermined range, the phase control part controls the changing of the phase of the pixel clock signal with respect to each region based on one of the corresponding amount and the corresponding new amount of the changing of the phase of the pixel clock signal stored by the phase change storing part before the determination by the position determination part.

5. The image-forming apparatus as claimed in claim 2, wherein the amounts of the changing of the phase of the pixel clock signal stored by the phase change storing part are set for each optical system.

6. An image-forming apparatus, comprising:
at least one imaging optical system configured to form an electrostatic latent image on an evenly charged scanning surface of a medium to be scanned moving in a sub scanning direction by scanning the scanning surface in a main scanning direction perpendicular to the sub scanning direction by periodically deflecting a laser beam emitted from a laser light source with a rotary deflector;
a print-out part configured to transfer the formed image to a transfer medium and print out the image;
a pixel clock generation part configured to generate a pixel clock signal for controlling timing of emission of the laser beam by the laser light source and change a phase of the pixel clock signal;
a region setting part configured to set length of each of a plurality of regions in the main scanning direction based on image writing magnifications in a line in the main scanning direction, the regions being formed by dividing part of the scanning surface corresponding to the line in the main scanning direction; and
a phase control part configured to control the changing of the phase of the pixel clock signal region by region based on the printed-out image, the printed-out image being read and input by an image reader connected to the image-forming apparatus.

7. The image-forming apparatus as claimed in claim 6, wherein the phase control part controls the changing of the phase of the pixel clock signal region by region based on a density of each region in the input read image.

8. An image-forming apparatus, comprising:
at least one imaging optical system configured to form an electrostatic latent image on an evenly charged scanning surface of a medium to be scanned moving in a sub scanning direction by scanning the scanning surface in a main scanning direction perpendicular to the sub scanning direction by periodically deflecting a laser beam emitted from a laser light source with a rotary deflector;
a print-out part configured to transfer the formed image to a transfer medium and print out the image;
a pixel clock generation part configured to generate a pixel clock signal for controlling timing of emission of the laser beam by the laser light source and change a phase of the pixel clock signal;
a region setting part configured to set length of each of a plurality of regions in the main scanning direction based on image writing magnifications in a line in the main scanning direction, the regions being formed by dividing part of the scanning surface corresponding to the line in the main scanning direction;
a reading part configured to read the printed-out image; and
a phase control part configured to control the changing of the phase of the pixel clock signal region by region based on the printed-out image.

9. The image-forming apparatus as claimed in claim 8, wherein the phase control part controls the changing of the phase of the pixel clock signal region by region based on a density of each region in the input read image.

10. The image-forming apparatus as claimed in claim 8, wherein the reading part reads an image pattern printed out by the print-out part, the image pattern being formed of a plurality of images of a same pattern being formed side by side in the main scanning direction at predetermined intervals.

11. The image-forming apparatus as claimed in claim 8, wherein the reading part reads an image pattern printed out by the print-out part in a reading direction, the image pattern being formed of a plurality of black lines each of a first width and a plurality of white lines each of a second width being repeated alternately in the reading direction with the first width of the black lines being less than or equal to 70% of a sum of the first width of the black lines and the second width of the white lines.

12. The image-forming apparatus as claimed in claim 8, wherein the reading part reads an image pattern printed out by the print-out part in a reading direction, the image pattern being formed of a plurality of black lines each of a first width and a plurality of white lines each of a second width being repeated alternately in the reading direction with the black lines being spaced at regular intervals each being greater than or equal to a predetermined value.

13. The image-forming apparatus as claimed in claim 8, wherein the reading part is provided external to the image-forming apparatus, the reading part being connected thereto via a network.

14. An optical scanner for forming an electrostatic latent image on an evenly charged scanning surface of a medium to be scanned moving in a sub scanning direction by scanning the scanning surface in a main scanning direction perpendicular to the sub scanning direction by periodically deflecting a laser beam emitted from a laser light source with a rotary deflector, the optical scanner comprising:
a pixel clock generation part configured to generate a pixel clock signal for controlling timing of emission of the laser beam by the laser light source and change a phase of the pixel clock signal with respect to each of a plurality of regions on the scanning surface, the regions each having length thereof in the main scanning direction set based on image writing magnifications in a line in the main scanning direction.

15. The optical scanner as claimed in claim 14, wherein the pixel clock generation part changes the phase of the pixel clock signal based on a phase change amount for each region calculated from a corresponding one of the image writing magnifications in the line in the main scanning direction.

* * * * *